US012764662B2

(12) United States Patent
He et al.

(10) Patent No.: US 12,764,662 B2
(45) Date of Patent: Oct. 13, 2026

(54) MULTIPLE ACTIVE DISCONTINUOUS RECEPTION (DRX) CONFIGURATIONS

(71) Applicant: QUALCOMM Incorporated, San Diego, CA (US)

(72) Inventors: Linhai He, San Diego, CA (US); Iyab Issam Sakhnini, San Diego, CA (US); Huilin Xu, Temecula, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 18/334,319

(22) Filed: Jun. 13, 2023

(65) Prior Publication Data

US 2024/0114451 A1 Apr. 4, 2024

Related U.S. Application Data

(60) Provisional application No. 63/377,724, filed on Sep. 29, 2022.

(51) Int. Cl.

*H04W 52/02* (2009.01)
*H04W 72/23* (2023.01)
*H04W 76/28* (2018.01)

(52) U.S. Cl.

CPC ....... *H04W 52/0229* (2013.01); *H04W 72/23* (2023.01); *H04W 76/28* (2018.02)

(58) Field of Classification Search

CPC .. H04W 52/0229; H04W 76/28; H04W 72/23
See application file for complete search history.

(56) References Cited

U.S. PATENT DOCUMENTS

2020/0037396 A1* 1/2020 Islam ................ H04W 52/0229

FOREIGN PATENT DOCUMENTS

| | | | | |
|---|---|---|---|---|
| CA | 3151522 A1 * | 2/2021 | ............ H04W 72/23 |
| WO | WO-2020240247 A1 * | 12/2020 | ............ H04W 72/23 |
| WO | WO-2021159315 A1 * | 8/2021 | .......... H04W 52/028 |
| WO | WO-2023069005 A1 * | 4/2023 | ............ H04W 72/23 |

* cited by examiner

*Primary Examiner* — Ricky Q Ngo
(74) *Attorney, Agent, or Firm* — ArentFox Schiff LLP

(57) ABSTRACT

A network node may configure a UE for discontinuous reception (DRX). The network node may transmit, to the UE, a plurality of DRX configurations. Further, the network node may transmit, to the UE, information associated with an active time of a first DRX configuration of the plurality of DRX configurations, with the active time being different from an inactive time of the first DRX configuration. Further, the network node may transmit, to the UE, data based on the active time of the first DRX configuration. The UE may receive the plurality of DRX configurations. Further, the UE may receive the information associated with the active time of the first DRX configuration. The UE may monitor for data based on the active time of the first DRX configuration.

29 Claims, 12 Drawing Sheets

MULTIPLE ACTIVE DISCONTINUOUS RECEPTION (DRX) CONFIGURATIONS

CROSS REFERENCE TO RELATED APPLICATION(S)

This application claims the benefit of U.S. Provisional Application Ser. No. 63/377,724, entitled "MULTIPLE ACTIVE DISCONTINUOUS RECEPTION (DRX) CONFIGURATIONS" and filed on Sep. 29, 2022, the disclosure of which is expressly incorporated by reference herein in its entirety.

BACKGROUND

Technical Field

The present disclosure generally relates to communication systems, and more particularly, to discontinuous reception (DRX) cycles that may be configured by a network node for a user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE or a component thereof. The apparatus may be configured to receive a plurality of discontinuous reception (DRX) configurations. The apparatus may be further configured to receive information associated with an active time of a first DRX configuration of the plurality of DRX configurations, the active time being different from an inactive time of the first DRX configuration. The apparatus may be further configured to monitor for data based on the active time of the first DRX configuration.

In another aspect of the disclosure, another method, another computer-readable medium, and another apparatus are provided. The other apparatus may be a network node or a component thereof. The other apparatus may be configured to transmit, to a UE, a plurality of DRX configurations. The other apparatus may be further configured to transmit, to the UE, information associated with an active time of a first DRX configuration of the plurality of DRX configurations, the active time being different from an inactive time of the first DRX configuration. The other apparatus may be further configured to transmit, to the UE, data based on the active time of the first DRX configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
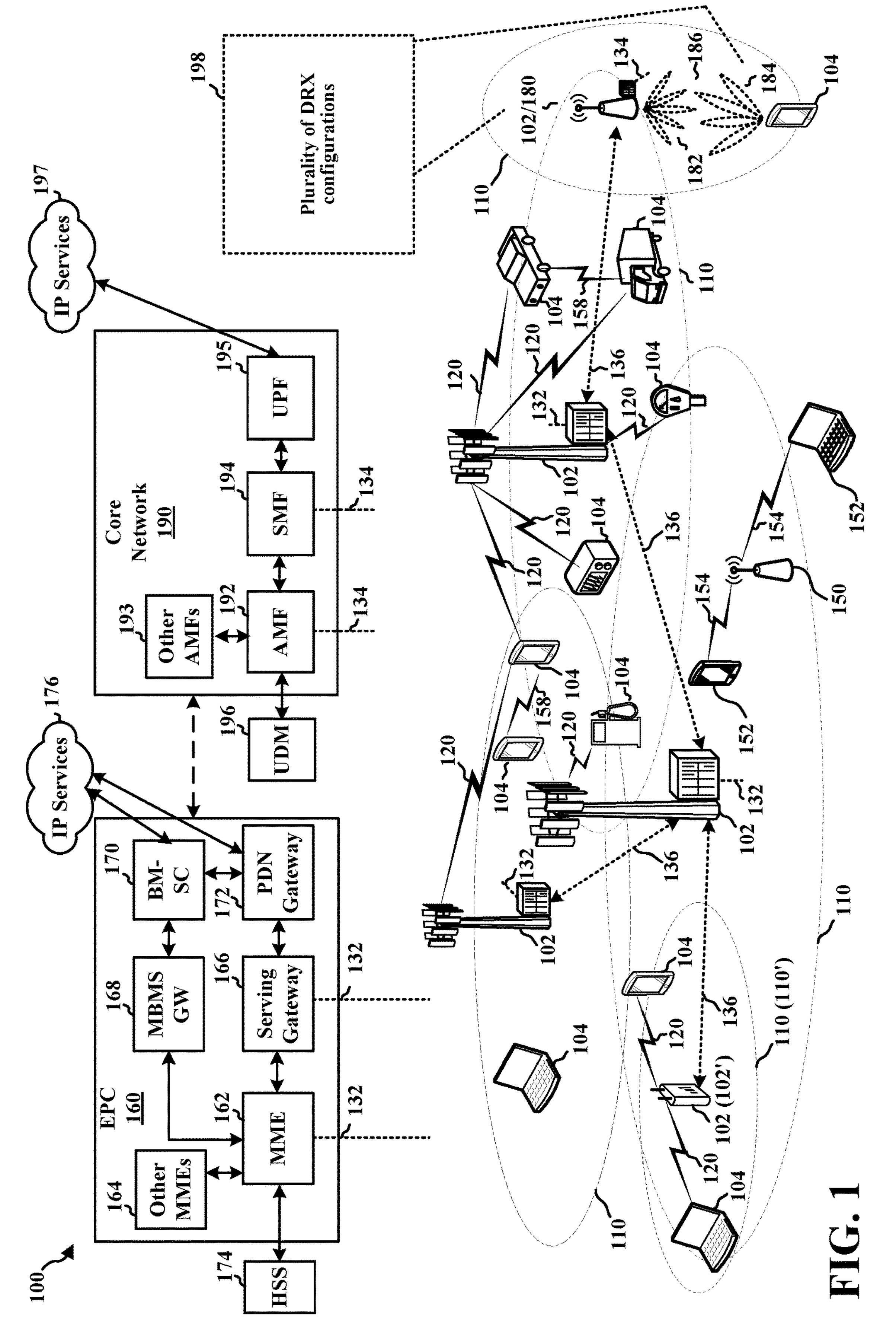
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells, such as high power cellular base stations, and/or small cells, such as low power cellular base stations (including femtocells, picocells, and microcells). A base station, or components thereof, may be an example of a network node.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as the Next Generation Radio Access Network (RAN) (NG-RAN), may interface with a core network 190 through second backhaul links 134. In addition to other functions, the base stations 102 may perform one or more of: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture including multiple units, some or all of which may be collocated or distributed and which may communicate with one another. For example, FIG. 2, infra, illustrates an example disaggregated base station 200 architecture that includes at least one of a central unit (CU) 210, a distributed unit (DU) 230, a radio unit (RU) 240, a remote radio head (RRH), a remote unit, and/or another similar unit configured to implement one or more layers of a radio protocol stack.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.).

A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cells and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz. In view of the foregoing, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102 may be implemented as a macro base station providing a large cell or may be implemented as a small cell 102' having a small cell coverage area. Some base stations 102 may operate in a traditional sub-6 GHz (or sub-7 GHz) spectrum, in mmW frequencies, and/or near-mmW frequencies in communication with the UE 104.

When such a base station operates in mmW or near-mmW frequencies, the base station may be referred to as a mmW base station 180. The mmW base station 180 may utilize beamforming 186 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182. The UE 104 may receive the beamformed signal from the base station 180 in one or more receive directions 184. The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

In various different aspects, one or more of the base stations 102/180 may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

In certain aspects, the UE 104 may receive a plurality of discontinuous reception (DRX) configurations 198. The UE 104 may receive information associated with an active time of a first DRX configuration of the plurality of DRX configurations 198, the active time being different from an inactive time of the first DRX configuration. The UE 104 may monitor for data based on the active time of the first DRX configuration.

The base station 102/180 may transmit, to the UE 104, a plurality of DRX configurations 198. The base station 102/180 may transmit, to the UE 104, information associated with an active time of a first DRX configuration of the plurality of DRX configurations 198, the active time being different from an inactive time of the first DRX configuration. The base station 102/180 may transmit, to the UE 104, data based on the active time of the first DRX configuration.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 2:
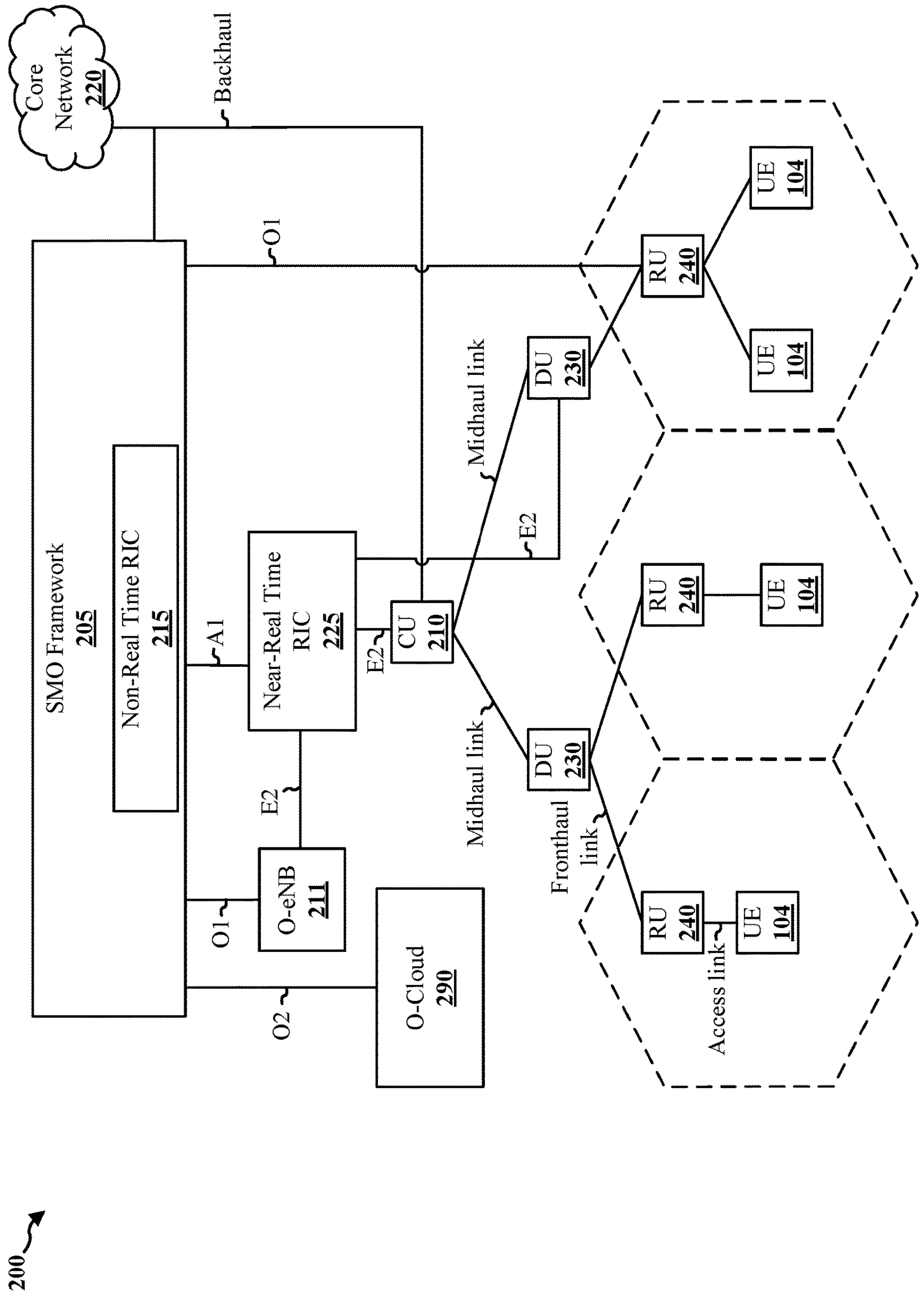
FIG. 2 is a diagram illustrating an example disaggregated base station architecture, in accordance with various aspects of the present disclosure.

FIG. 2 shows a diagram illustrating an example disaggregated base station 200 architecture. Deployment of communication systems, such as 5G NR systems, may be arranged in multiple manners with various components or constituent parts. In a 5G NR system, or network, a network node, a network entity, a mobility element of a network, a RAN) node, a core network node, a network element, or a network equipment, such as a base station, or one or more units (or one or more components) performing base station functionality, may be implemented in an aggregated or disaggregated architecture. For example, a base station (or network node) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 200 architecture may include one or more CUs 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3A:
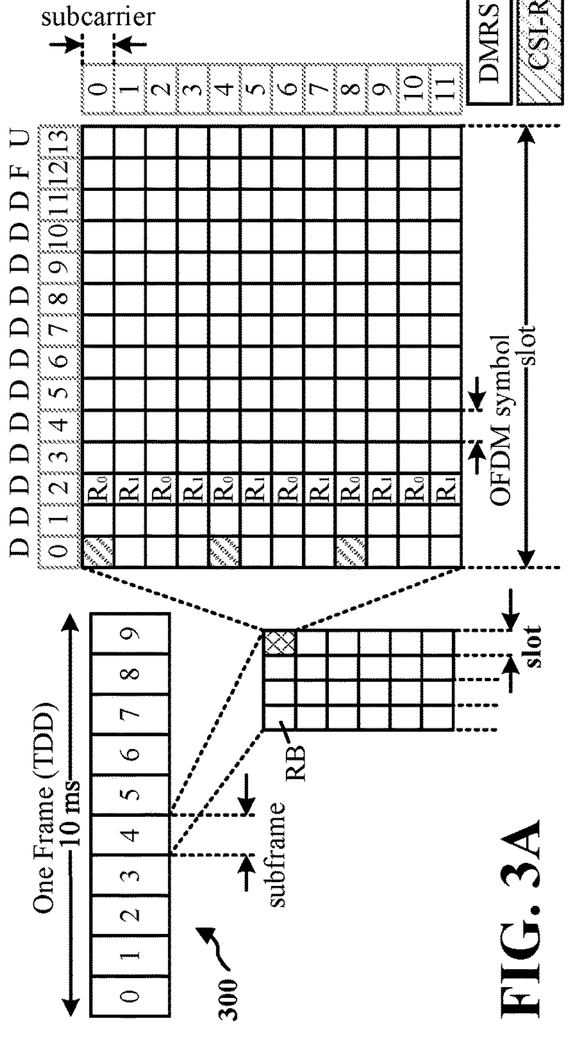
FIG. 3A is a diagram illustrating an example of a first frame, in accordance with various aspects of the present disclosure.
Figure 3B:
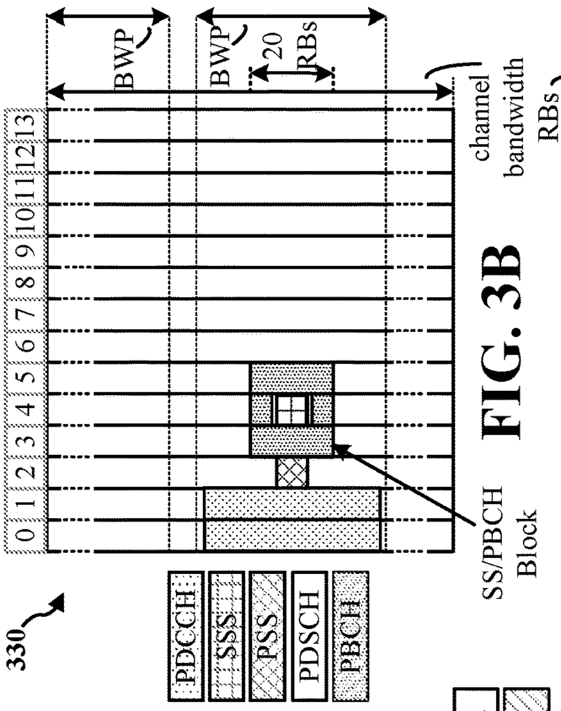
FIG. 3B is a diagram illustrating an example of downlink channels within a subframe, in accordance with various aspects of the present disclosure.
Figure 3C:
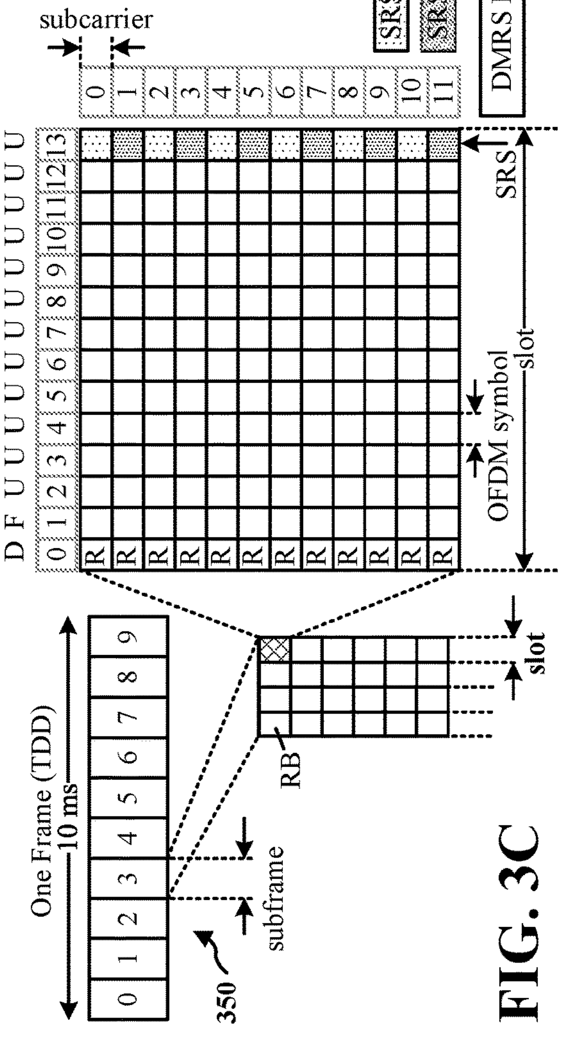
FIG. 3C is a diagram illustrating an example of a second frame, in accordance with various aspects of the present disclosure.
Figure 3D:
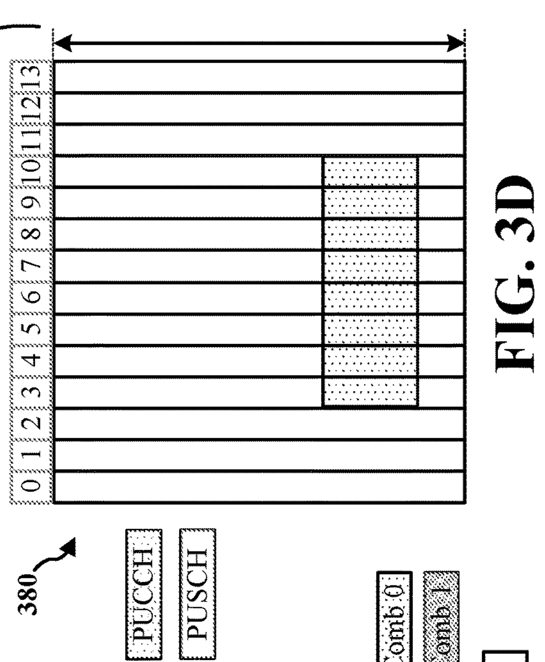
FIG. 3D is a diagram illustrating an example of uplink channels within a subframe, in accordance with various aspects of the present disclosure.

FIG. 3A is a diagram illustrating an example of a first subframe 300 within a 5G NR frame structure. FIG. 3B is a diagram illustrating an example of downlink channels within a 5G NR subframe 330. FIG. 3C is a diagram illustrating an example of a second subframe 350 within a 5G NR frame structure. FIG. 3D is a diagram illustrating an example of uplink channels within a 5G NR subframe 380. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 3A and 3C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds (1.6). Within a set of frames, there may be one or more different bandwidth parts (BWPs) (see FIG. 3B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 3B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1) may use the PSS to determine subframe/symbol timing and a physical layer identity. A secondary synchronization signal (SSS) may be within symbol 4 of particular subframes of a frame. A UE (such as a UE 104 of FIG. 1) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 3D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 4:
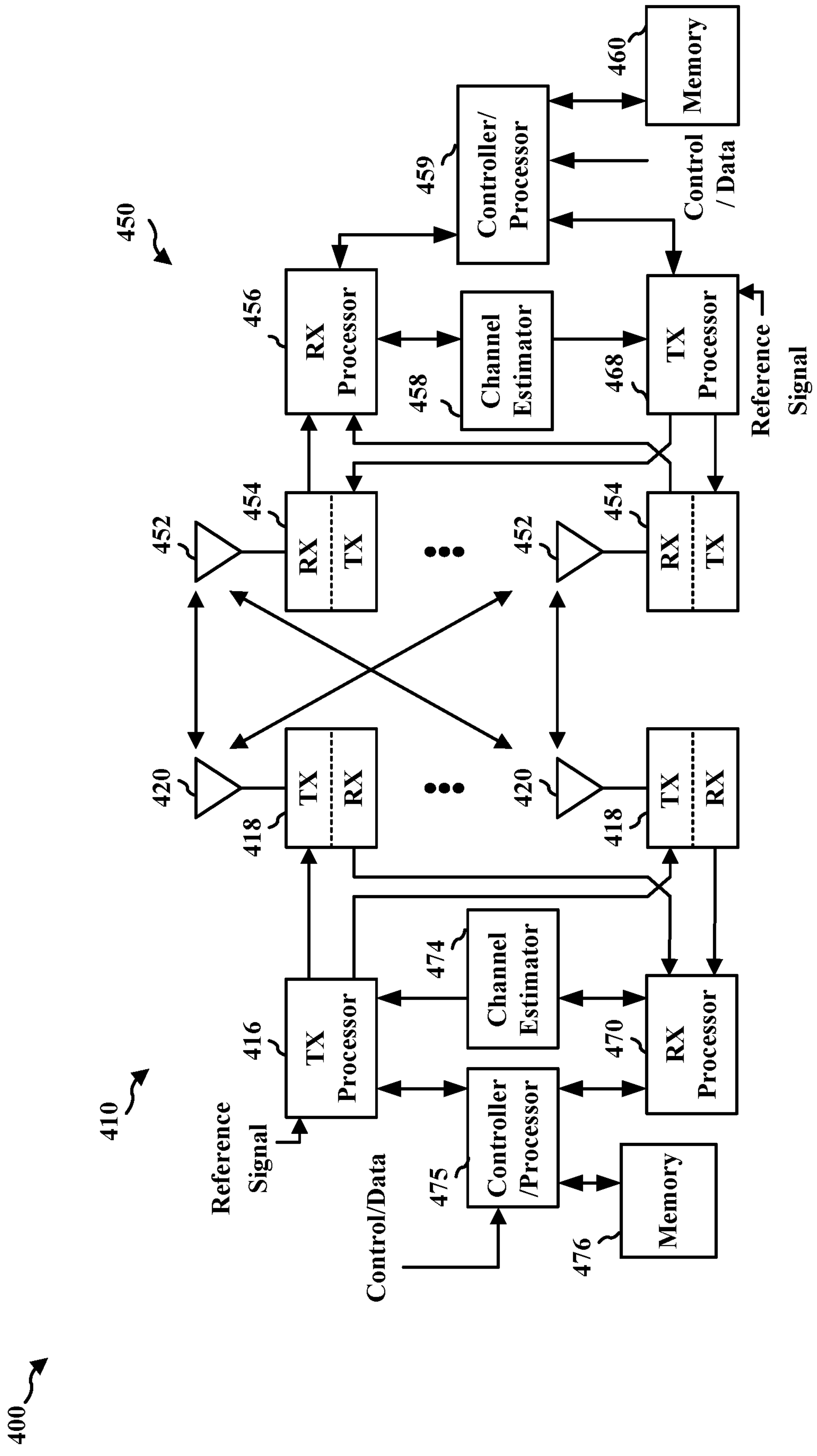
FIG. 4 is a diagram illustrating an example of a base station and user equipment (UE) in an access network, in accordance with various aspects of the present disclosure.

FIG. 4 is a block diagram of a base station 410 in communication with a UE 450 in an access network 400. In the downlink, IP packets from the EPC 160 may be provided to a controller/processor 475. The controller/processor 475 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 475 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission.

At the UE 450, each receiver 454RX receives a signal through at least one respective antenna 452. Each receiver 454RX recovers information modulated onto an RF carrier and provides the information to the receive (RX) processor 456. The TX processor 468 and the RX processor 456 implement L1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements L3 and L2 functionality.

The controller/processor 459 can be associated with a memory 460 that stores program codes and data. The memory 460 may be referred to as a computer-readable medium. In the uplink, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the downlink transmission by the base station 410, the controller/processor 459 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The uplink transmission is processed at the base station 410 in a manner similar to that described in connection with the receiver function at the UE 450. Each receiver 418RX receives a signal through at least one respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the uplink, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

In some aspects, at least one of the TX processor 468, the RX processor 456, and the controller/processor 459 may be configured to perform aspects in connection with the multiple DRX configurations 198 of FIG. 1.

In some other aspects, at least one of the TX processor 416, the RX processor 470, and the controller/processor 475 may be configured to perform aspects in connection with the multiple DRX configurations 198 of FIG. 1.

Figure 5:
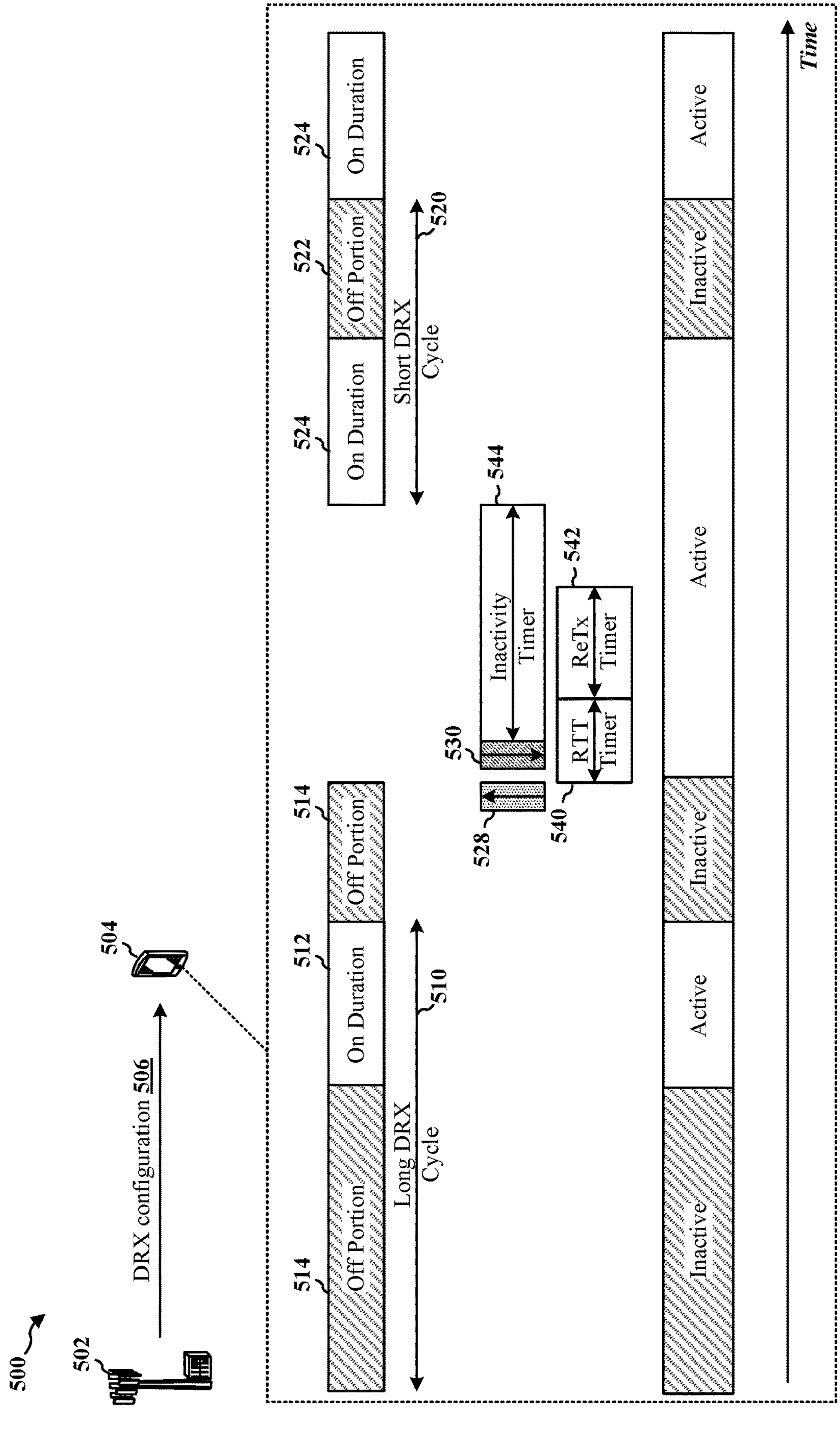
FIG. 5 is a diagram of an example implementation of discontinuous reception (DRX) cycles configured for a UE by a network node, in accordance with various aspects of the present disclosure.

FIG. 5 is a diagram 500 illustrating an example of DRX operation for a link between a base station 502 and a UE 504. The link may be a Uu link, such as with LTE and/or 5G NR access networks. DRX operation may conserve power at the UE 504, in addition to reducing signaling overhead and network interference (e.g., improved signal-to-noise ratio), by reducing the amount of signaling in which the UE 504 engages.

In some aspects, the base station 502 may configure at least one DRX cycle for the UE 504. Accordingly, the base station 502 may transmit a DRX configuration 506, which may indicate the at least one DRX cycle to the UE 504. For example, the base station 502 may transmit information configuring various parameters or other values that the UE 504 may apply in order to synchronize DRX cycles with those expected of the UE 504 as tracked by the base station 502. Specifically, the DRX configuration 506 may indicate at least one of an on duration 512, 522, an inactivity timer 544, a round trip time (RTT) timer 540, a retransmission (ReTx) timer 542, a long DRX cycle 510, a short DRX cycle 520, and/or other such information. Some of the aforementioned timers may trigger transition by the UE 504 between an active, awake state (e.g., in which the UE 504 monitors for and receives downlink transmission) and an inactive, sleep state (e.g., in which the UE 504 refrains from decoding downlink resources).

The UE 504 may be configured with at least one of a long DRX cycle 510 and a short DRX cycle 520. For example, the long DRX cycle 510 may be 10-50240 ms. The long DRX cycle 510 may include an on duration 512 during which the UE 504 monitors a control channel (e.g., PDCCH) for grants and an off portion 514 during which the UE 504 may not monitor the control channel. For example, the UE 504 may reduce or power off some circuitry and/or other component(s)—specifically, receiver circuitry or other circuitry for monitoring, amplifying, converting, etc. received signaling—during the off portion 514.

When the UE 504 is configured to operate with at least one of the DRX cycles 510, 520, and the UE 504 is connected with the base station 502, the mode of operation of the UE 504 may be connected mode DRX (C-DRX). For example, when the UE 504 is in an RRC Connected state with the base station 502, as when the UE 504 may be assigned uplink grants indicated to the UE 504 on the control channel, the UE 504 may be operating in C-DRX.

Where the base station 502 intends to send data to the UE 504 on a downlink data channel (e.g., PDSCH), the base station 502 may first schedule the data on downlink data channel resources and transmit such scheduling information to the UE 504 in control information 530, which may be a DCI message. The UE 504 may be configured to monitor the downlink control channel (e.g., PDCCH) in order to detect the downlink control information 530 and identify the resources of the downlink data channel scheduled to carry the data intended for the UE 504. For example, the UE 504 may periodically monitor the downlink control channel, e.g., the timing of which may be PDCCH occasions.

In order to elicit an uplink grant and request the base station 502 allocate resources for uplink transmission, the UE 504 may transmit an SR 528. Specifically, data may arrive at a lower layer (e.g., L2, such as MAC) of the UE 504, at which point the data may be buffered while an SR procedure is triggered for the UE 504 in which the UE 504 may transmit an SR 528 and await an uplink grant, which may be included in the control information 530. If the arrival of uplink data from a higher layer coincides with an off portion of a long DRX cycle 510 or an off portion 524 of a short DRX cycle 520, the UE 504 may transition out of an inactive state into an active state in order to find a grant responsive to the SR transmission.

In response to the SR 528, the base station 502 may transmit control information 530 (e.g., DCI), which may indicate a grant including resources allocated to the UE 504 on an uplink (data) channel for transmission of uplink data pending and buffered at the UE 504. Potentially, the base station 502 may transmit some control information to the UE 504 for downlink data, as well, as the base station 502 may assume that the UE 504 will be awake for a duration that is sufficient to receive downlink data while the inactivity timer.

The UE 504 may find the control information 530 (and grant) by decoding information on resources of the control channel; however, such decoding may be blind decoding for which the UE 504 (continuously) attempts to decode any information on the control channel having the potential to be a grant for the UE 504 using an radio network temporary identifier (RNTI) of the UE 504 to evaluate a cyclic redundancy check (CRC) or other similar data integrity/security check. If the check using the UE RNTI passes, then the information on the control channel is intended for the UE 504. If such a check using the UE RNTI fails, the UE ceases decoding the information on the control channel.

Potentially, the UE 504 may fail to receive the control information 530, e.g., because either the UE 504 missed the control information 530 or, if the UE 504 is expecting the control information 530 to include a grant in response to an SR 528, the base station 502 missed the SR 528 or was unable to allocate resources to the UE 504 in response to the SR 528. In aspects in which the control information 530 provides an uplink grant to the UE 504, the UE 504 may fail to transmit pending data on the granted resources if the UE 504 misses the control information 530, as the UE 504 will be unaware of which resources have been allocated to the UE 504. In aspects in which the control information 530 is scheduling a downlink data transmission, the UE 504 may fail to decode the information on the scheduled downlink data channel resources if the UE 504 misses the control information 530, as the UE 504 may be unaware of which downlink data channel resources are carrying data intended for the UE 504.

In some instances, the UE 504 may be configured to retransmit the SR, such as when some uplink data remains pending for a period of time following SR transmission. For example, SR retransmission may be conditioned upon whether data is pending uplink transmission (and whether an SR prohibit timer is running), but SR transmission may be agnostic to whether any grant has been received.

In some aspects, the UE 504 may be configured with an SR prohibit timer to define a duration following transmission of an SR 528 that the UE 504 is to wait before retransmitting an SR where the earlier SR goes unanswered. If the UE 504 does not receive a grant for uplink transmission in response to an SR 528, the UE 504 may retransmit the SR upon expiration of the SR prohibit timer—although the UE 504 does not necessarily need to retransmit the SR, such as when pending uplink data is of a relatively lower priority. SR retransmission assumes that the UE 504 has not already satisfied (e.g., met or exceeded) a maximum number of SR retransmission attempts.

In some aspects, the UE 504 may initiate the RTT timer 540 for a HARQ process of a transmission. If the transmission is an uplink transmission, such as an SR, the RTT timer 540 may start at the end of the uplink transmission. If the transmission is a downlink transmission, the RTT timer 540 may start at the end of an ACK/NACK for the downlink transmission. The RTT timer 540 may measure an amount of time until the UE 504 is to monitor for a grant or scheduling information for a retransmission. The UE 504 may start the ReTX timer 542 to monitor a window during which a grant or schedule for the retransmission may be received.

If the UE 504 receives control information for a retransmission, the UE 504 may start the RTT timer 540 again and monitor for control information again while the ReTx timer 542 is running. Because control information (e.g., scheduling information and/or grant) for a retransmission does not restart the inactivity timer 544, the RTT timer 540 and/or the retransmission timer 542 may run while the UE 504 is in the short DRX cycle. The UE 504 may monitor for the retransmission of control information during the short DRX cycle 520 even if the UE 504 is not in the on duration 522.

Figure 6:
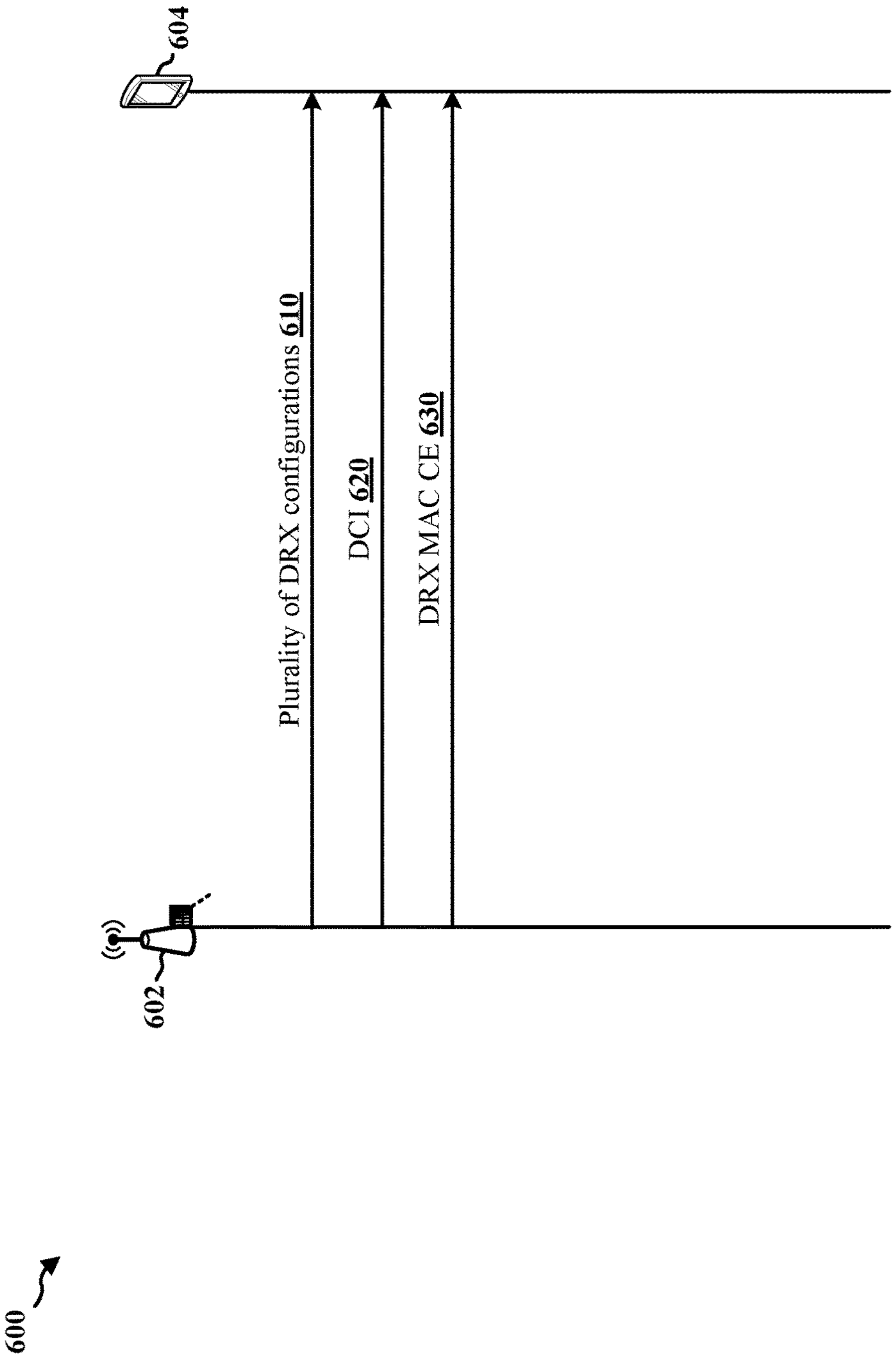
FIG. 6 is a call flow diagram of an example of a base station configuring multiple DRX configurations at a UE for communication in DRX cycles, in accordance with various aspects of the present disclosure.

FIG. 6 shows a call flow diagram 600 illustrating an example of a base station 602 configuring a plurality of DRX configurations 610 at a UE 604 for communication in DRX cycles, in accordance with various aspects of the present disclosure As illustrated, a UE 604 may be configured by a base station 602 with a plurality of DRX configurations 610 for a set of carriers with which the UE 604 is configured. The set of carriers may be all of the carriers with which the UE 604 is configured, or the set of carriers may be all of the carriers in one of FR1 or FR2 with which the UE 604 is configured.

According to some instances of RATs (e.g., Release 15 of 5G NR), only one DRX configuration can be configured. According to some other RATs (e.g., Release 16 of 5G NR), however, dual DRX configurations were introduced, with one DRX configuration for FR1 and another for FR2. However, two DRX configurations can have independent DRX inactivity timers (DITs) while having the same DRX cycle.

One use case for introducing multiple active DRX configurations is Extended Reality (XR) applications. XR applications may generate different types of traffic flows—e.g., video, audio, voice, control, pose update, etc.—having different traffic periodicities. For example, video flows may have non-integer valued periodicities, (e.g., 1000/60 ms), which may not be supported by the some potential values of DRX configurations. In another example, voice or control flows may have integer value periodicities (e.g., 10 ms). Employing a single DRX configuration to support multiple traffic flows having different periodicities may be prohibitively complex in some instances in which those different periodicities are not integer multiples of one another.

One of ordinary skill in the relevant art will appreciate that the concepts and various aspects disclosed herein are not limited to XR applications. Rather, any applications having multiple traffic flows may realize some benefit from the concepts and various aspects provided for in the present disclosure. For example, applications having traffic flows with traffic periodicities that are not integer multiples of each other may benefit from multiple DRX configurations, e.g., as such an approach may reduce overhead and/or computational complexity involved in finding DRX parameters that are suitable for multiple traffic flows.

According to various aspects of the present disclosure, the base station 602 may configure the plurality of DRX configurations 610 to include multiple active DRX configurations for a MAC entity of the UE 604. Each active DRX configuration may be associated with a respective set of parameters, including one or more of: a start offset, a slot offset, a DRX on duration timer (DODT), a DIT, a short cycle timer, a short DRX cycle, a long DRX cycle, a power save (PS) offset (ps-offset), a PS wakeup (ps-wakeup), a PS transmit other periodic CSI (ps-TransmitOtherPeriodicCSI), and/or a PS transmit periodic L1 RSRP (ps-TransmitPeriodicL1-RSRP).

Further, each of the DRX configurations may be mapped to a set of logical channels (LCHs). For each of the configured DRX configurations, the base station 602 may configure a respective set of LCHs to be associated therewith. The base station 602 may transmit, to the UE 604, information indicating each of the sets of LCHs that is associated with a respective DRX configuration.

In some aspects, the UE 604 may be configured to receive the plurality of DRX configurations 610. In some aspects, the UE 604 may be configured with joint configuration with DRX groups that indicate each of the DRX configurations is associated with a respective secondary DRX configuration (e.g., according to a standard promulgated by 3GPP, such as Release 18 of 5G NR). That is, the same set of DRX parameters (e.g., except DODT and DIT) may be shared between the primary and secondary DRX configurations. In some other aspects, the base station 602 may configure a DRX configuration to be restricted to a specific set of carriers. For example, DRX configuration #1 may be configured for a first set of carriers, whereas DRX configuration #2 may be configured for all carriers with which the UE 604 is configured. When updating DIT, the UE 604 may do so based on the association between one or more of the DRX configurations and carriers. Moreover, the UE 604 may determine whether the association with carriers is met or not, in addition to whether an LCH-to-DRX mapping is satisfied.

According to various aspects of joint configuration with dynamic adaption of DRX configurations, the base station 602 may preconfigure a set of candidate instances for each of the DRX configurations. The base station 602 may use L1 and/or L2 signaling to indicate which instance of which DRX configuration the UE 604 should use.

With joint configuration with dynamic adaption of DRX configurations, there may be two levels of DRX active time at the UE 604: one level at a MAC entity and another at an individual DRX configuration. A DRX configuration may be considered in active time if any of the following timers is true: a DODT of the DRX configuration is running; a DIT of the DRX configuration is running; a downlink and/or uplink HARQ ReTx timer of a HARQ process having a TB that includes data from an LCH associated with the DRX configuration is running; an SR has been sent on PUCCH and is pending; and/or a RACH procedure is initiated or ongoing or otherwise incomplete (e.g., when a random access contention resolution (ra-ContentionResolution Timer) timer or a msgB response window (msgB-Response Window) timer is running). For active time triggered by the RACH procedure and active time triggered by SR transmission, all DRX configurations may be in active time. A MAC entity of the UE 604 may be considered in DRX active time if any of the DRX configurations associated therewith is in active time.

The active time may be different from an inactive time of a DRX configuration. A DRX configuration may be considered in inactive time if all of the following timers are true: a DODT of the DRX configuration is not running; a DIT of the DRX configuration is not running; a downlink and/or uplink HARQ ReTx timer of a HARQ process having a TB that includes data from an LCH associated with the DRX configuration is not running; no SR is pending; and no RACH procedure is initiated or ongoing or otherwise incomplete (e.g., when neither a random access contention resolution timer nor a msgB response window timer is running). A MAC entity of the UE 604 may be considered in DRX inactive time if none of the DRX configurations associated therewith is in active time.

In some systems, a network may be restricted to DRX active time of a UE for scheduling new downlink and/or uplink data. Since the network may often benefit from having fewer restrictions on a scheduler of a network node, the network may be able to schedule data on any LCH within active time of a DRX configuration at a MAC entity. In some other aspects, the network may benefit from having some scheduling restrictions based on at least one DRX configuration, e.g., in order to prevent bursty traffic.

Further, the UE 604 may receive information associated with an active time of a first DRX configuration of the plurality of DRX configurations (the active time may be different from an inactive time of the first DRX configuration). With multiple DRX configurations, multiple DIT timers may be started or restarted. Doing so in a synchronized or semi-synchronized manner may be beneficial to UE operation.

The base station 602 may transmit DCI 620 to the UE 604 in a PDCCH search space. The DCI 620 may schedule one of uplink and/or downlink data. At least a portion of the DCI 620 may be scrambled with a RNTI.

Figure 7:
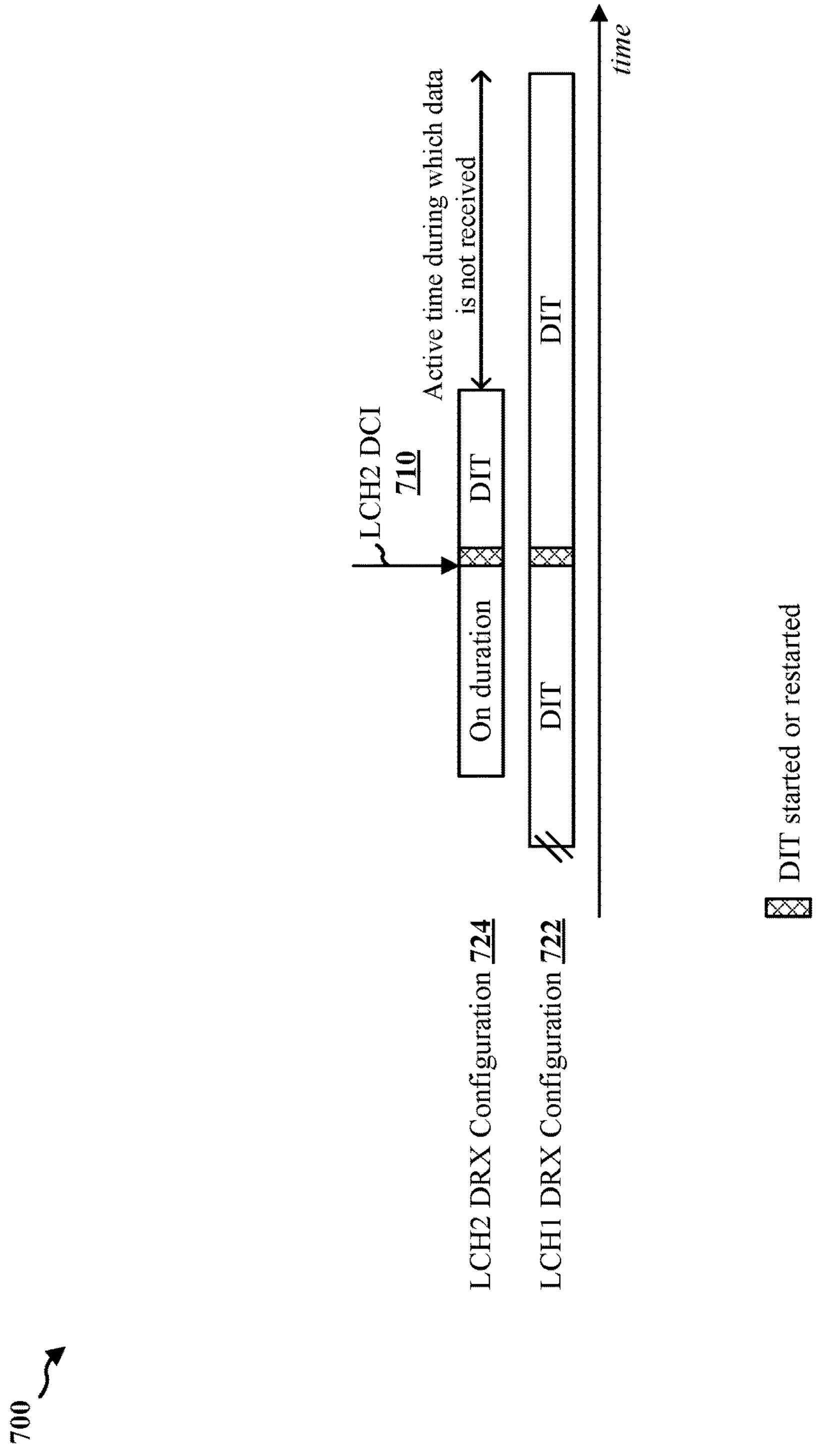
FIG. 7 is a diagram of example DRX cycles of multiple DRX configurations implemented at a UE, in accordance with various aspects of the present disclosure.

As shown in example 700 of FIG. 7, in some aspects, upon receiving a DCI 710 scheduling new downlink and/or uplink data on LCH2, the UE 604 starts or restarts DITs of the LCH1 DRX configuration 722 in addition to the LCH2 DRX configuration 724 (e.g., all DRX configurations configured for the UE 604). Starting or restarting each DIT may impact all DRX configurations configured for the UE 604 because the UE 604 may be unable to discern the LCH(s) for which data is being scheduled using the DCI 710 alone. However, starting or restarting a respective DIT of each DRX configuration may be inefficient with respect to power consumption, particularly when DITs in different DRX configurations have different values.

Figure 8:
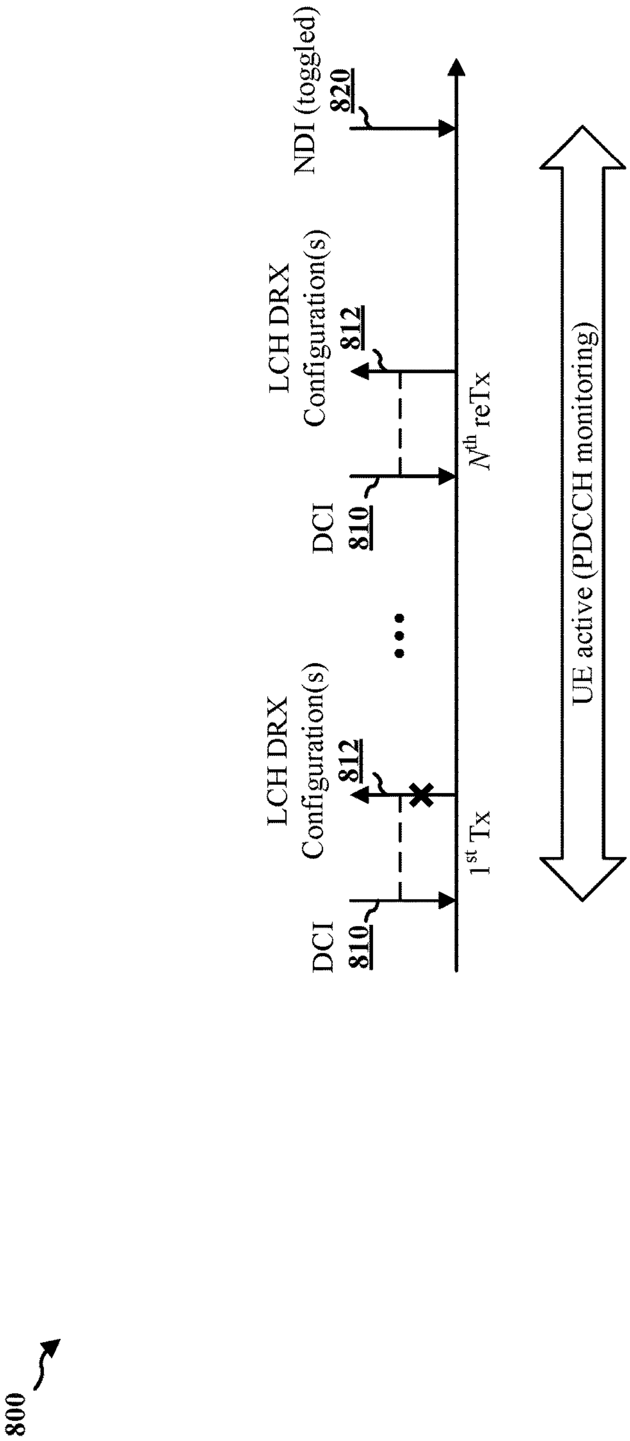
FIG. 8 is a diagram of an example of communication between a network node and a UE having multiple DRX configurations, in accordance with various aspects of the present disclosure.

As shown in example 800 of FIG. 8, in some other aspects, the UE 604 starts or restarts DITs of selected DRX configuration(s) 812, depending upon what data is selected/transmitted. For example, if the DCI 810 is for (new) downlink data, the UE 604 may be unaware the LCH(s) on which the base station 602 is sending data until the UE 604 successfully decodes the PDSCH carrying the downlink data. Therefore, the UE 604 may start or restart the DIT(s) of the DRX configuration(s) 812 associated with the LCH(s) carrying the received downlink data after sending a positive HARQ ACK.

If the DCI 810 is for (new) uplink data, the base station 602 may be unaware of the data the UE 604 will be sending until the base station 602 successfully decodes the PUSCH. Therefore, the UE 604 may start or restart the DIT(s) of the DRX configuration(s) 812 associated with the LCH(s) carrying the transmitted data after the UE 604 receives a DCI 810 for the same HARQ process of the data transmitted on the PUSCH, with the new data indicator (NDI) 820 bit toggled.

In still other aspects, a scheduling restriction may be added to the scheduler of the base station 602. On downlink, if only DRX configuration #n is in active time in slot n, the base station 602 may transmit data only from a LCH(s) that is associated with DRX configuration #n. On uplink, if only DRX configuration #n is in active time in slot n, the UE 604 may be prohibited from multiplexing data from a LCH(s) that is not associated with DRX configuration #n. If multiple DRX configurations are in active time in slot n, the above conditions may become the union of the eligible LCHs. When the UE 604 receives a scheduling DCI for new data in slot n, the UE 604 may start or restart DITs of the set of DRX configurations which are in active time in slot n.

In still other aspects, the base station 602 may provide an indication in DCI on which DIT(s) should be started or restarted (or for which DRX configurations the DCI is intended). The UE 604 may start or restart DITs as indicated in the DCI in response to receiving the DCI on the PDCCH. If the DCI schedules new uplink data, the UE 604 may multiplex data from only those LCHs associated with the DRX configuration(s) whose DIT is associated with (e.g., indicated in the DCI into the scheduled PUSCH.

In still other aspects, the indication on which DIT(s) the UE 604 is to start or restart may be implicitly indicated through the PDCCH search space in which the DCI 620 is received. The base station 602 may configure a mapping between a DRX configuration and a PDCCH search space. Based on the search space in which the UE 604 receives a scheduling DCI 620, the UE 604 may identify one or more DRX configurations for which a respective DIT should be started or restarted.

In yet further aspects, the indication on which DIT(s) to start or restart may be signaled via an RNTI with which the DCI 620 is scrambled. The base station 602 may configure (and transmit to the UE 604) a mapping between a DRX configuration and an RNTI used to scramble a scheduling DCI 620. Based on the RNTI with which a scheduling DCI 620 is scrambled, the UE 604 may determine the corresponding DRX configuration(s) mapped thereto and may start or restart the DIT(s) of that DRX configuration(s).

In even further aspects, the base station 602 may configure DRX configurations into primary and secondary groups. When at least one DRX configuration in the primary group is in active time, the UE 604 may start or restart DITs of all DRX configurations with which the UE 604 is configured. If only DRX configurations in the secondary group are in active time, the UE 604 may start or restart only the DITs associated with DRX configurations associated with the secondary group.

In even other aspects, the base station 602 may configure primary and secondary groups, as above, however, DRX configurations in the secondary group may not have DITs running. At end of an on duration of those DRX configurations, the base station 602 may include an indication in DCI to indicate whether the UE 604 should start or restart DITs of those DRX configurations of the secondary group.

According to some aspects, the start time of a DODT in a DRX configuration may be calculated based on the start/slot offset and DRX cycle (either short or long) of a particular DRX configuration. Such calculation may be independent of other DRX configurations.

According to some aspects, a short DRX cycle timer associated with a DRX configuration may be started or restarted when the DIT associated with the same DRX configuration expires.

The base station 602 may transmit a MAC control element (CE) 630 to the UE 604. The MAC CE 630 may be associated with at least one of the plurality of DRX configurations 610. For example, the MAC CE 630 may be included in a TB that further includes data on a LCH associated with one of the plurality of DRX configurations 610, and therefore, the MAC CE 630 may be associated with that one of the plurality of DRX configurations 610.

The UE 604 may receive a MAC CE associated with at least one DRX configuration from the base station 602. In some aspects, when the UE 604 receives a MAC CE associated with at least one DRX configuration, the UE 604 may stop all DITs of all DRX configurations with which the UE 604 is configured. In some other aspects, however, the UE 604 may stop DITs of only the relevant DRX configuration(s), where relevant DRX configurations are the set of DRX configurations whose DITs are supposed to be start or restarted based on either data on an LCH(s) in the same TB as the MAC CE associated with at least one DRX configuration or the indication in the DCI 620. In some other aspects, the MAC CE 630 associated with at least one DRX configuration may be extended to include an indication(s) of the DRX configuration(s) for which a corresponding DIT should be stopped.

In some aspects, the UE 604 may be configured to skip a PDCCH. In some aspects, when the UE 604 receives a PDCCH skipping indication in a DCI 620, the UE 604 suspends active time of all DRX configurations with which the UE 604 is configured for a duration according to what is indicated by the base station 602.

In some other aspects, the UE 604 suspends active time of the relevant DRX configuration(s) for a duration according to what is indicated by the base station 602, where relevant DRX configurations are the set of DRX configurations having DITs configured to be started or restarted based on either data on LCH(s) in the same TB as the MAC CE associated with at least one DRX configuration or the indication in the DCI.

In still other aspects, a PDCCH skipping indication may be extended or enhanced to include an indication of which DRX configuration(s) should suspend their active time.

A wakeup signal (WUS) may cause the UE 604 to transition from inactive time to active time for a certain DRX configuration. A single WUS configuration shared by all DRX configurations with which the UE 604 is configured may be insufficient, however. Due to different DRX cycles, especially when some are non-integer values and some are integer values, the time offset between start time of different DRX configurations may change over time and may have large values. Therefore, each DRX configuration may be allowed to have its own WUS configuration.

Each DRX configuration has its own monitoring occasions, its own values of PS Offset (ps-Offset), PS Wakeup (ps-Wakeup), ps-TransmitOtherPeriodicCSI, and ps-TransmitPeriodicL1-RSRP. The UE 604 may be configured as to when to monitor WUS occasions of a DRX configuration.

In one aspect, the UE 604 may monitor for a WUS for DRX configuration #n if the current slot is outside the active time of DRX configuration #n. This monitoring may be done regardless of whether there is another DRX configuration in active time in the current slot.

In another aspect, the UE 604 may monitor for a WUS for DRX configuration #n if the current slot is outside the active time of all DRX configurations with which the UE 604 is configured. Such an aspect may be efficient in that the base station 602 may be able to cancel the on duration of a DRX configuration within the active time of another DRX configuration.

A WUS and/or inactive time of a DRX configuration may be associated with some additional parameters, such as ps-Offset, ps-Wakeup, ps-TransmitOtherPeriodicCSI, and/or ps-TransmitPeriodicL1-RSRP. One or more such parameters may be coordinated. For example, if two DRX configurations have different values for ps-Wakeup, ps-TransmitOtherPeriodicCSI, or ps-TransmitPeriodicL1-RSRP, during the time period in which their on durations overlap, the values of those parameters may be considered "true."

According to various aspects of the present disclosure, if two DRX configurations have different values for CSI masking, during the time period in which their active times overlap, the UE 604 may be configured to transmit periodic or semi-persistent CSI over PUCCH during that time period.

According to various aspects of the present disclosure, for CSI and/or SRS transmission, the UE 604 may transmit CSI and/or SRS in slot n as long as at least one DRX configuration is in active time in slot n.

According to various other aspects of the present disclosure, for CSI and/or SRS transmission, the UE 604 may be configured by the base station 602 as to whether the UE 604 transmits CSI and/or SRS only in the active time of a selected set of DRX configurations.

According to various aspects of the present disclosure, the UE 604 may provide UE Assistance Information (UAI) to the base station 602 for configuration of DRX configurations. For example, the UE 604 may request preferred parameter values for any of its DRX configurations in a UE Assistance Information message.

According to various aspects of the present disclosure, for some RAN1 and/or RAN4 procedures, the UE 604 may select a DRX configuration of the plurality of DRX configurations from which to use one or more parameters for some or all RAN1 and/or RAN4 procedures. In some aspects, a number of RAN1 procedures and RAN4 timing requirements use a DRX cycle of the UE 604 as one of their parameters, such as radio link monitoring (RLM), beam failure detection (BFD), and radio resource monitoring (RRM), and/or relaxation criteria associated therewith. Timing requirement for interruption during transitions b/w active and non-active DRX for multi-RAT dual connectivity (MR-DC). In some aspects, the minimum of DRX cycles of all DRX configurations is used as the reference for some or all of the RAN1 and/or RAN4 procedures. In some other aspects, the base station 602 may configure which DRX configuration's DRX cycle should be used as a reference for some or all of the RAN1 and/or RAN4 procedures.

Figure 9:
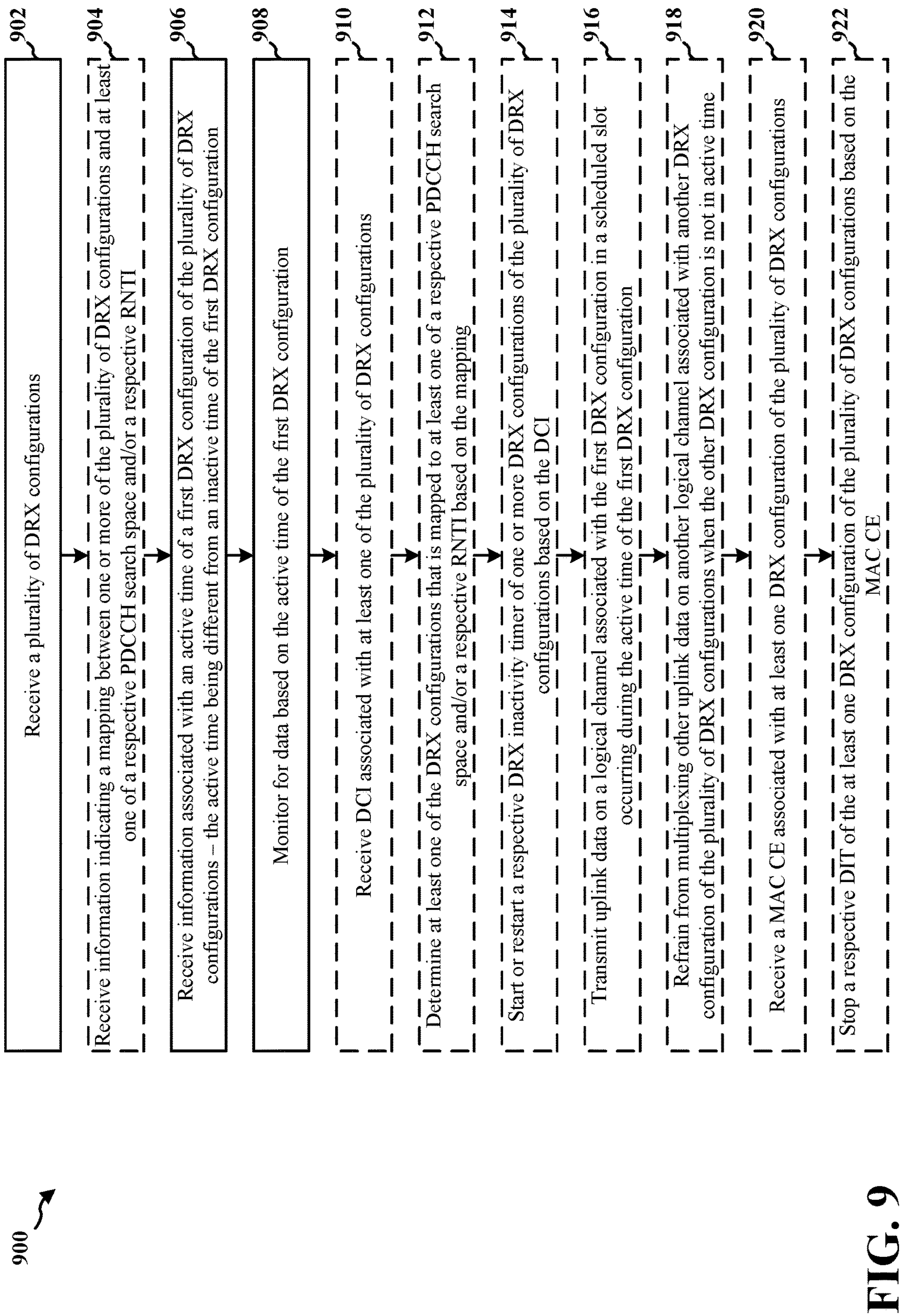
FIG. 9 is a flowchart illustrating an example of a method of wireless communication at a UE, in accordance with various aspects of the present disclosure.

FIG. 9 is a flowchart 900 of a method of wireless communication. The method may be performed by or at a UE (e.g., at least one of the UEs 104, 450, 504, 604), another wireless communications apparatus (e.g., the apparatus 1102 of FIG. 11), or one or more components thereof. According to various different aspects, one or more of the illustrated blocks may be omitted, transposed, and/or contemporaneously performed.

At 902, the UE may receive a plurality of DRX configurations. In some aspects, each of the plurality of DRX configurations may include at least one value corresponding to at least one of: a start offset, a slot offset, a DRX on duration timer, a DIT, a short DRX cycle timer, a short DRX cycle, a long DRX cycle, a PS offset, a PS wakeup, a PS transmit other periodic CSI, or a PS transmit periodic L1 RSRP. In some aspects, each of the plurality of DRX configurations may be associated with a respective set of LCHs. In some other aspects, each DRX configuration of the plurality of DRX configurations is associated with all carriers with which the UE is configured.

In some aspects, the plurality of DRX configurations may include a first DRX configuration and a second DRX configuration. The first DRX configuration may include at least one first value for at least one of a PS wakeup, a PS transmit ps-TransmitOtherPeriodicCSI, or a ps-TransmitPeriodicL1-RSRP that is separately configured from at least one second value for a corresponding at least one of the PS wakeup, the ps-TransmitOtherPeriodicCSI, or the ps-TransmitPeriodicL1-RSRP, and the at least one first value may be set to be equal to the at least one second value when the first DRX configuration and the second DRX configuration are overlapping in time.

In some other aspects, the UE may be configured to transmit a value requested for a parameter of a first DRX configuration. The plurality of DRX configurations may include a first DRX configuration having the corresponding parameter set to the value requested by the UE.

In still further aspects, the UE may be configured to apply one DRX cycle from a plurality of DRX cycles of the plurality of DRX configurations to at least one procedure associated with at least one of RLM, BFD, or RRM. In some examples, the one DRX cycle includes a minimum DRX cycle of the plurality of DRX cycles. In some other examples, the UE may be configured to receive information indicating the one DRX cycle.

For example, in the context of FIG. 6, 902 may be shown by the UE 604 receiving, from the base station 602, a plurality of DRX configurations 610.

At 904, the UE may receive information indicating a mapping between one or more of the plurality of DRX configurations and at least one of a respective PDCCH search space and/or a respective RNTI.

For example, in the context of FIG. 6, 904 may be shown by the UE 604 receiving, from the base station 602, information indicating a mapping between one or more of the plurality of DRX configurations 610 and at least one of a respective PDCCH search space and/or a respective RNTI.

At 906, the UE may receive information associated with an active time of a first DRX configuration of the plurality of DRX configurations. The active time may be different from an inactive time of the first DRX configuration. In some aspects, the UE may be configured to transition from the inactive time to the active time of the first DRX configuration at a configured time period, and the information associated with the active time of the first DRX configuration may indicate the configured time period. In some aspects, the information associated with the active time of the first DRX configuration is received via one of L1 or L2 signaling. In some aspects, the plurality of DRX configurations may be configured for a first set carriers included in one of FR1 or FR2, and the first DRX configuration may be associated with a second set of carriers included in another of FR1 or FR2.

For example, in the context of FIG. 6, 906 may be shown by the UE 604 receiving, from the base station 602, information associated with an active time of a first DRX configuration of the plurality of DRX configurations 610.

At 908, the UE may monitor for data based on the active time of the first DRX configuration. For example, the UE may transition from a lower power state (e.g., an inactive state) to a higher power state (e.g., an active state) for an active time of a DRX configuration, and during the active time of the DRX configuration, the UE may receive signals on a set of resources on which the UE is configured to detect energy (e.g., RF waves). In some other aspects, the UE may detect signaling on resources in a PDCCH search space (e.g., a PDCCH search space to which the first DRX configuration is mapped), and the UE may blindly decode the signaling on the resources in the search space until the UE finds a PDCCH intended for the UE.

In still other aspects, the UE may be configured to monitor for data based on an active time of a second DRX configuration of the plurality of DRX configurations. In some aspects, the active time of the first DRX configuration and the active time of the second DRX configuration may at least partially overlap.

In yet further aspects, the UE may monitor for data based on a WUS. For example, the UE may be configured to receive a WUS associated with the first DRX configuration, and the WUS may indicate such an association with the first DRX configuration and not an association with other DRX configurations of the plurality of DRX configurations. The UE may be configured to monitor for the WUS associated with the first DRX configuration in a current slot when each DRX configuration is not in active time in the current slot, and the UE may start a DRX on duration timer of the first DRX configuration based on the WUS when the WUS is received.

For example, in the context of FIG. 6, 908 may be shown by the UE 604 receiving, from the base station 602, information associated with an active time of a first DRX configuration of the plurality of DRX configurations 610.

At 910, the UE may be configured to receive DCI associated with at least one of the plurality of DRX configurations. The UE may receive the DCI while the UE is in an active state (e.g., an active state of the first DRX configuration and/or an active state of the second DRX configuration) and is monitoring resources. In some aspects, the DCI includes information scheduling one of downlink data or uplink data, and one or more of the plurality of DRX configurations may be associated with a respective LCH on which the one of the downlink data or the uplink data is scheduled. In some other aspects, the UE may be configured to receive DCI associated with a first LCH of a set of LCHs when monitoring for the data based on the active time of the first DRX configuration; however, the set of LCHs may be associated with a second DRX configuration of the plurality of DRX configurations. In some other aspects, the UE may receive the DCI in a PDCCH search space that is mapped to at least one DRX configuration of the plurality of DRX configurations. In some other aspects, an RNTI with which the information (e.g., DCI) is scrambled indicates the one or more DRX configurations.

In yet further aspects, the DCI received by the UE may indicate a set of resources on a PDCCH to be skipped (e.g., a set of resources carrying information that the UE is to refrain from decoding). The UE may be further configured to suspend activity of one or more DRX configurations of the plurality of DRX configurations that is active based on such DCI. In some examples, the DCI may further include information identifying the one or more DRX configurations of the plurality of DRX configurations. In some other examples, the one or more DRX configurations may include each DRX configuration that is active when the DCI is received.

For example, in the context of FIG. 6, 910 may be shown by the UE 604 receiving, from the base station 602, DCI 620 associated with at least one DRX configuration of the plurality of DRX configurations 610.

At 912, the UE may determine at least one of the DRX configurations that is mapped to at least one of a respective PDCCH search space and/or a respective RNTI based on the mapping. In one example, the UE may receive information configuring a PDCCH search space in which the UE is to find a downlink transmission (e.g., DCI) carried on a PDCCH intended for the UE. The UE may look up an entry in the mapping that corresponds to the specific PDCCH search space with which the UE is configured, and the UE may identify the at least one DRX configuration corresponding to the entry to which the specific PDCCH search space is mapped. In another example, the UE may receive DCI that is scrambled with at least one RNTI associated with the UE. The UE may successfully descramble the RNTI using the at least one RNTI, and based thereon, the UE may look up an entry in the mapping that corresponds to the at least one RNTI used to successfully descramble the DCI. The UE may identify the one or more DRX configurations mapped to the at least one RNTI used to successfully descramble the DCI based on the entry (or entries) in the mapping that corresponds to the at least one RNTI.

For example, in the context of FIG. 6, 912 may be shown by the UE 604 determining at least one of the plurality of DRX configurations 610 that is mapped to at least one of a respective PDCCH search space and/or a respective RNTI based on the mapping.

At 914, the UE may be configured to start or restart a respective DIT of one or more DRX configurations of the plurality of DRX configurations based on the DCI. In some aspects, the UE may start or restart a respective DIT of one or more DRX configurations of the plurality of DRX configurations that are mapped to the PDCCH search space in which the UE received the DCI (e.g., based on determining the one or more DRX configurations that are mapped to the PDCCH search space). In some other aspects, the UE may start or restart a respective DIT of one or more DRX configurations of the plurality of DRX configurations that are mapped to the RNTI with which the UE successfully descrambled the DCI (e.g., based on determining the one or more DRX configurations that are mapped to the at least one RNTI). In still further aspects, the UE may start or restart a respective DIT of each of the plurality of DRX configurations based on the received DCI.

In some additional aspects, the UE may be configured to receive DCI indicating to start or restart a respective DRX cycle of each DRX configuration of a subset of the plurality of DRX configurations. In one example, the UE may be configured to receive information indicating a first subset of the plurality of DRX configurations and a second subset of the plurality of DRX configurations. The UE may be configured to start or restart the DITs of all DRX configurations when at least one of the first subset of DRX configurations is in active time (e.g., based on the received DCI), or the UE may be configured to start or restart the DITs of the second subset of DRX configurations when at least one of the second subset of DRX configurations is in active time (e.g., based on the received DCI and when no DRX configuration of the first subset is in active time).

In another example, a subset of the plurality of DRX configurations may include those DRX configurations that do not include a DIT that is running. In such an example, the UE may be configured to start or restart the respective DIT of each DRX configuration of the subset based on the DCI. For example, the DCI may include an instruction to start or restart the DITs of the subset of DRX configurations having the DITs that are not running.

For example, in the context of FIG. 6, 914 may be shown by the UE 604 starting or restarting a respective DIT of one or more DRX configurations of the plurality of DRX configurations 610 based on the DCI 620.

At 916, the UE may be configured to transmit data on a LCH associated with a first DRX configuration in a scheduled slot occurring during the active time of the first DRX configuration. The UE may measure the active time associated with the first DRX configuration using a timer configured with a duration defined by the first DRX configuration.

In some aspects, the UE may be configured to transmit one of periodic or semi-persistent CSI on a PUCCH when a first DRX configuration and a second DRX configuration of the plurality of DRX configurations are simultaneously active and have different values for CSI masking. In some other aspects, the UE may be configured to transmit at least one of CSI or an SRS in a slot when at least one of the plurality of DRX configurations is active in the slot. For example, the UE may receive information indicating at least one DRX configuration of the plurality of DRX configurations for which transmission of at least one of CSI or an SRS is permissible, and the UE may transmit the at least one of the CSI or the SRS when the at least one DRX configuration is active.

For example, in the context of FIG. 6, 916 may be shown by the UE 604 transmitting, to the base station 602, data on an LCH associated with a first DRX configuration of the plurality of DRX configurations 610 in a slot occurring scheduled during the active time of the first DRX configurations.

At 918, the UE may refrain from multiplexing other uplink data on another LCH associated with another DRX configuration of the plurality of DRX configurations when the other DRX configuration is not in active time. Illustratively, when a DRX configuration n of the plurality of DRX configurations is in active time in a slot i, the UE may refrain from multiplexing uplink data from another LCH that is not associated with the DRX configuration n in the slot i. Thus, the UE may identify each DRX configuration that is in active time when the UE has uplink data to transmit (e.g., uplink data held in a buffer) on an LCH, and the UE may multiplex the uplink data that is associated with the identified DRX configurations but refrain from multiplexing any uplink data that is not associated with the identified DRX configurations.

For example, in the context of FIG. 6, 918 may be shown by the UE 604 refraining from multiplexing other uplink data on another LCH associated with another DRX configuration of the plurality of DRX configurations 610 when the other DRX configuration is not in active time.

At 920, the UE may receive a MAC CE associated with at least one DRX configuration of the plurality of DRX configurations. For example, at least one MAC CE may be included in a MAC header of a frame or subframe received by the UE, and the at least one MAC CE may include information that is applicable to and/or identifies at least one of the plurality of DRX configurations.

For example, in the context of FIG. 6, 920 may be shown by the UE 604 receiving, from the base station 602, a MAC CE 630 associated with at least one DRX configuration of the plurality of DRX configurations 610.

At 922, the UE may stop a respective DIT of the at least one DRX configuration of the plurality of DRX configurations based on the MAC CE associated with the at least one DRX configuration. In some aspects, the MAC CE associated with the at least one DRX configuration may include information identifying the at least one DRX configuration of the plurality of DRX configurations. In some other aspects, the one or more DRX configurations may include each DRX configuration that is active when the MAC CE associated with the at least one DRX configuration is received. In still other aspects, the MAC CE associated with the at least one DRX configuration may be received in a TB that further includes downlink data on at least one LCH, and the at least one DRX configuration with which the MAC CE is associated may be further associated with a respective LCH of the at least one LCH. In still further aspects, the MAC CE associated with the at least one DRX configuration may be received in a TB that further includes downlink data on at least one LCH, and the at least one DRX configuration may be further associated with a respective LCH of the at least one LCH.

For example, in the context of FIG. 6, 920 may be shown by the UE 604 receiving, from the base station 602, a MAC CE 630 associated with at least one DRX configuration of the plurality of DRX configurations 610.

Figure 10:
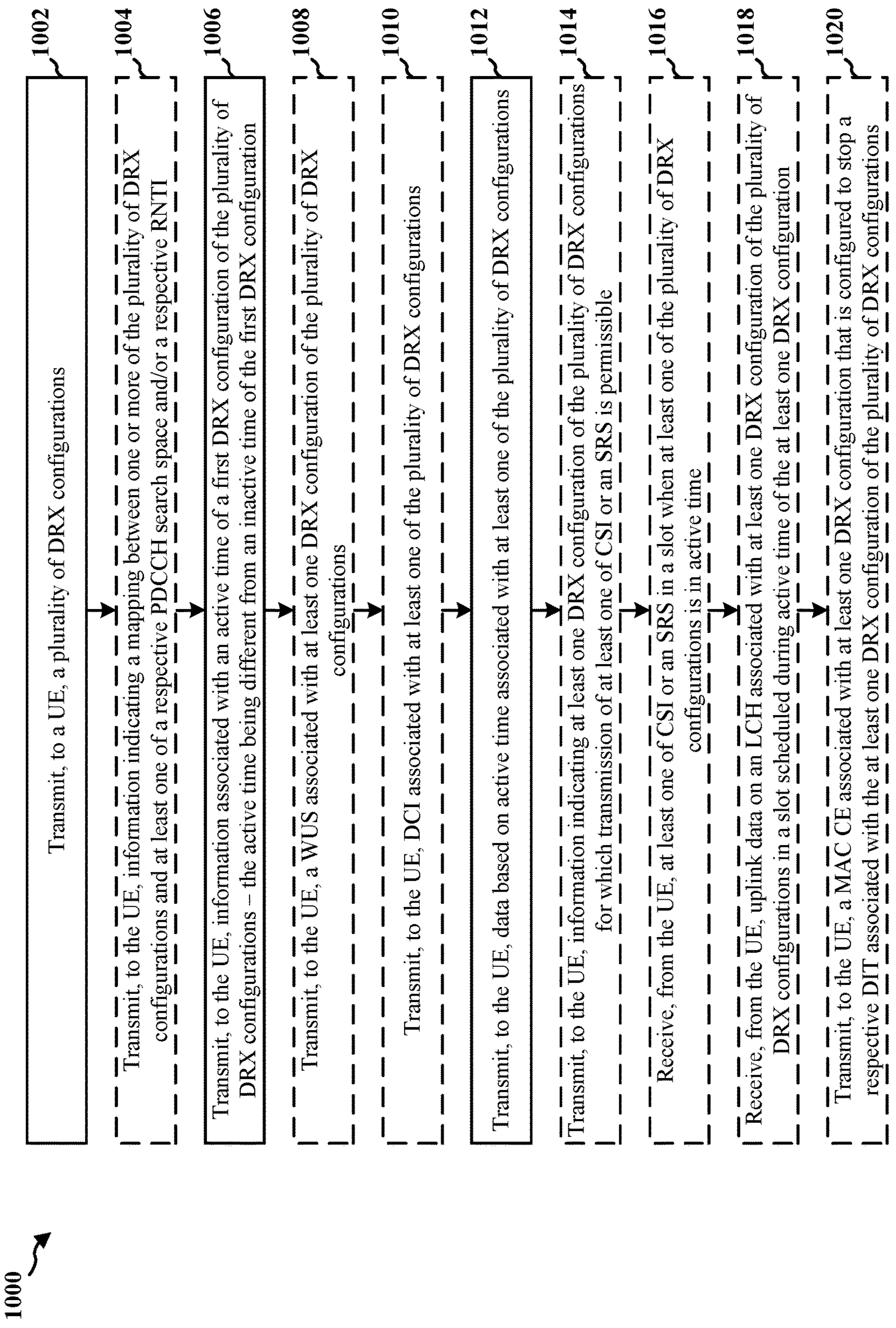
FIG. 10 is a flowchart illustrating an example of a method of wireless communication at a network node, in accordance with various aspects of the present disclosure.

FIG. 10 is a flowchart 1000 of a method of wireless communication. The method may be performed by or at a base station (e.g., the base station 102/180, 410, 502, 602), a network node, another wireless communications apparatus (e.g., the apparatus 1202), or one or more components thereof. According to various different aspects, one or more of the illustrated blocks may be omitted, transposed, and/or contemporaneously performed.

At 1002, the base station may transmit, to a UE, a plurality of DRX configurations. In some aspects, each of the plurality of DRX configurations may include at least one value corresponding to at least one of: a start offset, a slot offset, a DRX on duration timer, a DIT, a short DRX cycle timer, a short DRX cycle, a long DRX cycle, a PS offset, a PS wakeup, a PS transmit other periodic CSI, or a PS transmit periodic L1 RSRP. In some aspects, each of the plurality of DRX configurations may be associated with a respective set of LCHs. In some other aspects, each DRX configuration of the plurality of DRX configurations is associated with all carriers with which the UE is configured.

In some aspects, the plurality of DRX configurations may include a first DRX configuration and a second DRX configuration. The first DRX configuration may include at least one first value for at least one of a PS wakeup, a PS transmit ps-TransmitOtherPeriodicCSI, or a ps-TransmitPeriodicL1-RSRP that is separately configured from at least one second value for a corresponding at least one of the PS wakeup, the ps-TransmitOtherPeriodicCSI, or the ps-TransmitPeriodicL1-RSRP, and the at least one first value may be set to be equal to at least one of the second value when the first DRX configuration and the second DRX configuration are overlapping in time.

In some other aspects, the base station may receive, from the UE, a value requested for a parameter of a first DRX configuration. The base station may set a value of the corresponding parameter of a first DRX configuration of the plurality of DRX configurations to the value requested by the UE.

In still further aspects, the base station may configure the UE to apply one DRX cycle from a plurality of DRX cycles of the plurality of DRX configurations to at least one procedure associated with at least one of RLM, BFD, or RRM. In some examples, the one DRX cycle includes a minimum DRX cycle of the plurality of DRX cycles. In some other examples, the base station may transmit, to the UE, information indicating the one DRX cycle.

For example, in the context of FIG. 6, 1002 may be shown by the base station 602 transmitting, to the UE 604, a plurality of DRX configurations 610.

At 1004, the base station may transmit, to the UE, information indicating a mapping between one or more of the plurality of DRX configurations and at least one of a respective PDCCH search space and/or a respective RNTI.

For example, in the context of FIG. 6, 1004 may be shown by the base station 602 transmitting, to the UE 604, information indicating a mapping between one or more of the plurality of DRX configurations 610 and at least one of a respective PDCCH search space and/or a respective RNTI.

At 1006, the base station may transmit, to the UE, information associated with an active time of a first DRX configuration of the plurality of DRX configurations. The active time may be different from an inactive time of the first DRX configuration. In some aspects, the information associated with the active time of the first DRX configuration may configure the UE to transition from the inactive time to the active time of the first DRX configuration at a configured time period. In some aspects, the information associated with the active time of the first DRX configuration is transmitted via one of L1 or L2 signaling. In some aspects, the plurality of DRX configurations may be configured for a first set carriers included in one of FR1 or FR2, and the first DRX configuration may be associated with a second set of carriers included in another of FR1 or FR2.

For example, in the context of FIG. 6, 1006 may be shown by the base station 602 transmitting, to the UE 604, information associated with an active time of a first DRX configuration of the plurality of DRX configurations 610.

At 1008, the base station may transmit, to the UE, a WUS associated with at least one DRX configuration of the plurality of DRX configurations. In some aspects, the WUS may configure the UE to monitor for at least one of data and/or control information. For example, the WUS may indicate an association with a first DRX configuration and not an association with other DRX configurations of the plurality of DRX configurations. The base station may transmit the WUS associated with the first DRX configuration in a current slot when each DRX configuration of the UE is not in active time in the current slot; however, the WUS may trigger the UE to start a DRX on duration timer of the first DRX configuration when the WUS is received.

For example, in the context of FIG. 6, 1008 may be shown by the base station 602 transmitting, to the UE 604, a WUS associated with at least one DRX configuration of the plurality of DRX configurations 610.

At 1010, the base station may transmit, to the UE, DCI associated with at least one of the plurality of DRX configurations. The base station may transmit the DCI while the UE is in an active state (e.g., an active state of a first DRX configuration and/or an active state of a second DRX configuration) and is monitoring resources. In some aspects, the DCI may configure the UE to start or restart a respective DIT of the at least one DRX configuration of the plurality of DRX configurations. In some aspects, the at least one DRX configuration includes all of the plurality of DRX configurations. In some aspects, the base station may transmit, to the UE, information indicating a first subset of the plurality of DRX configurations and a second subset of the plurality of DRX configurations, and the first subset of the plurality of DRX configurations includes each of the plurality of DRX configurations when at least one of the first subset of DRX configurations is in active time, or the at least one DRX configuration includes the second subset when at least one of the second subset of DRX configurations is in active time.

In some aspects, the DCI includes information scheduling one of downlink data or uplink data, and one or more of the plurality of DRX configurations may be associated with a respective LCH on which the one of the downlink data or the uplink data is scheduled. In some other aspects, the base station may transmit DCI associated with a first LCH of a set of LCHs when the UE is monitoring for data based on an active time of a first DRX configuration; however, the set of LCHs may be associated with a second DRX configuration of the plurality of DRX configurations. In some other aspects, the base station may transmit the DCI in a PDCCH search space that is mapped to at least one DRX configuration of the plurality of DRX configurations. In some other aspects, an RNTI with which the DCI (e.g., CRC of the DCI) is scrambled may indicate the at least one DRX configuration. For example, the DCI may indicate a respective DIT of the at least one DRX configuration of the plurality of DRX configurations that is to be started or restarted.

In yet further aspects, the DCI transmitted by the base station may indicate a set of resources on a PDCCH to be skipped (e.g., a set of resources carrying information that the UE is to refrain from decoding). The base station may configure the UE to suspend activity of one or more DRX configurations of the plurality of DRX configurations that is active based on such DCI. In some examples, the DCI may further include information identifying the one or more DRX configurations of the plurality of DRX configurations. In some other examples, the one or more DRX configurations may include each DRX configuration that is active when the DCI is transmitted.

For example, in the context of FIG. 6, 1010 may be shown by the base station 602 transmitting, to the UE 604, DCI 620 associated with at least one of the plurality of DRX configurations 610.

At 1012, the base station may transmit, to the UE, data based on active time associated with at least one DRX configuration of the plurality of DRX configurations. In some examples, the base station may transmit, to the UE in slot i, downlink data associated with LCHs that are associated with DRX configurations in active time in slot i. In some other examples, the base station may transmit, to the UE in slot i, downlink data associated all LCHs when at least one of the DRX configurations with which the UE is configured is in active time in slot i. Illustratively, the base station may transmit, to the UE, DCI associated with a first LCH of a set of LCHs associated with a second DRX configuration of the plurality of DRX configurations during active time of a first DRX configuration of the plurality of DRX configurations. The active time of the first DRX configuration and the active time of the second DRX configuration may at least partially overlap. In some aspects, each of the plurality of DRX configurations is associated with a respective set of LCHs.

For example, in the context of FIG. 6, 1012 may be shown by the base station 602 transmitting, to the UE 604, data based on active time associated with at least one DRX configuration of the plurality of DRX configurations 610.

At 1014, the base station may transmit, to the UE, information indicating at least one DRX configuration of the plurality of DRX configurations for which transmission of at least one of CSI or an SRS is permissible.

For example, in the context of FIG. 6, 1014 may be shown by the base station 602 transmitting, to the UE 604, information indicating at least one DRX configuration of the plurality of DRX configurations 610 for which transmission of at least one of CSI or an SRS is permissible.

At 1016, the base station may receive, from the UE, at least one of CSI or an SRS in a slot when at least one of the plurality of DRX configurations is in active time at the UE. In some aspects, the base station may receive, from the UE, one of periodic or semi-persistent CSI on a PUCCH when a first DRX configuration and a second DRX configuration of the plurality of DRX configurations are simultaneously in active time and have different values for CSI masking.

For example, in the context of FIG. 6, 1016 may be shown by the base station 602 receiving, from the UE 604, information indicating at least one DRX configuration of the plurality of DRX configurations 610 for which transmission of at least one of CSI or an SRS is permissible.

At 1018, the base station may receive, from the UE, uplink data on an LCH associated with the at least one DRX configuration of the plurality of DRX configurations in a slot scheduled during the active time of the at least one DRX configuration. In some aspects, other uplink data on another LCH(s) associated with other DRX configuration(s) of the plurality of DRX configurations that is not in active time is not multiplexed with the uplink data on the LCH.

For example, in the context of FIG. 6, 1018 may be shown by the base station 602 receiving, from the UE 604, uplink data on an LCH associated with the at least one DRX configuration of the plurality of DRX configurations 610 in a slot scheduled during the active time of the at least one DRX configuration.

At 1020, the base station may transmit, to the UE, a MAC CE configured to stop a respective DIT of one or more DRX configurations of the plurality of DRX configurations. In some aspects, the one or more DRX configurations includes each DRX configuration that is active when the MAC CE associated with at least one DRX configuration is transmitted.

For example, in the context of FIG. 6, 1020 may be shown by the base station 602 transmitting, to the UE 604, a MAC CE 630 configured to stop a respective DIT of one or more DRX configurations of the plurality of DRX configurations 610.

Figure 11:
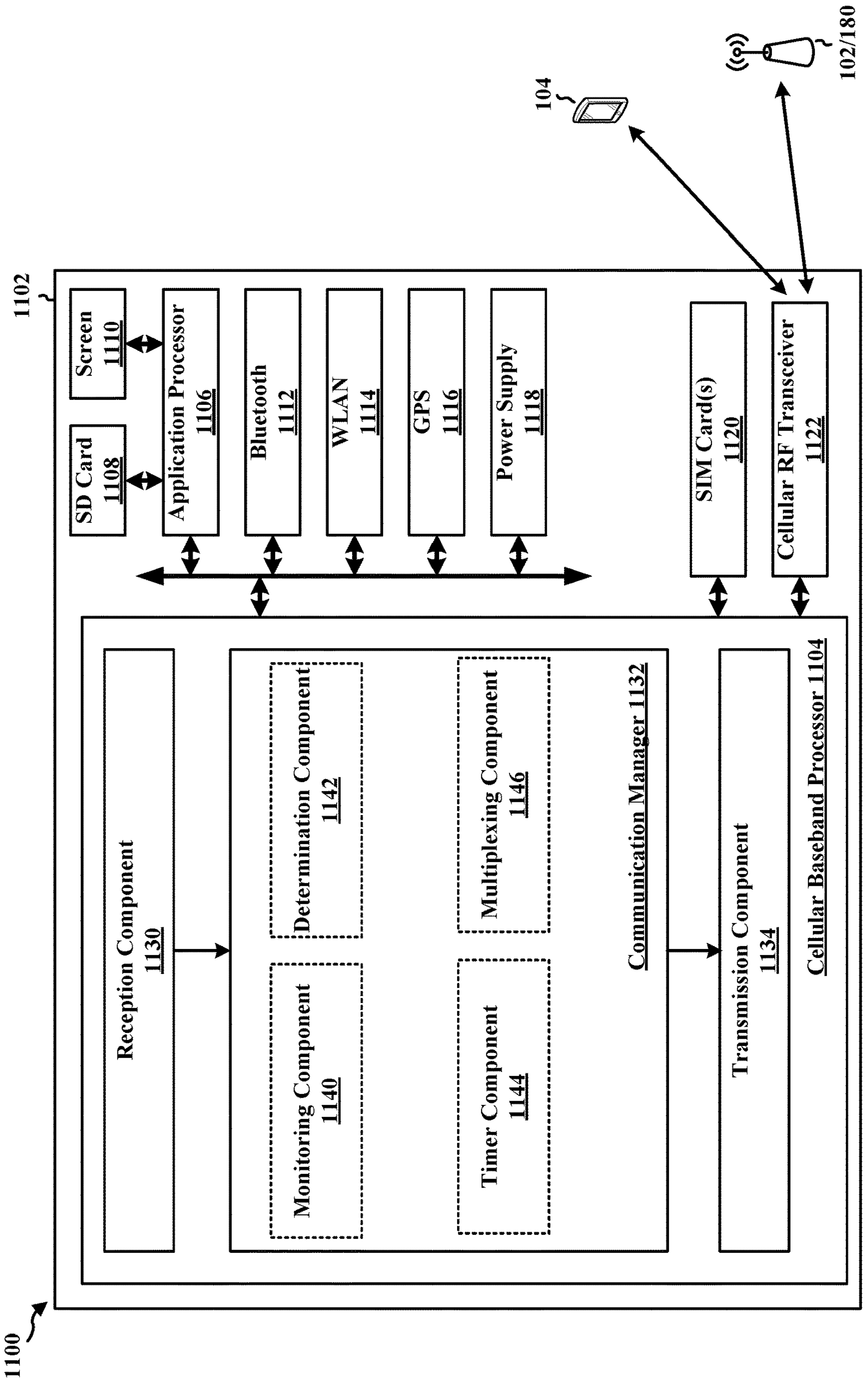
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE or similar device, or the apparatus 1102 may be a component of a UE or similar device. The apparatus 1102 may include a cellular baseband processor 1104 (also referred to as a modem) and/or a cellular RF transceiver 1122, which may be coupled together and/or integrated into the same package, component, circuit, chip, and/or other circuitry.

In some aspects, the apparatus 1102 may accept or may include one or more subscriber identity modules (SIM) cards 1120, which may include one or more integrated circuits, chips, or similar circuitry, and which may be removable or embedded. The one or more SIM cards 1120 may carry identification and/or authentication information, such as an international mobile subscriber identity (IMSI) and/or IMSI-related key(s). Further, the apparatus 1102 may include one or more of an application processor 1106 coupled to a secure digital (SD) card 1108 and a screen 1110, a Bluetooth module 1112, a wireless local area network (WLAN) module 1114, a Global Positioning System (GPS) module 1116, and/or a power supply 1118.

The cellular baseband processor 1104 communicates through the cellular RF transceiver 1122 with the UE 104 and/or base station 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104.

In the context of FIG. 4, the cellular baseband processor 1104 may be a component of the UE 450 and may include the memory 460 and/or at least one of the TX processor 468, the RX processor 456, and/or the controller/processor 459. In one configuration, the apparatus 1102 may be a modem chip and/or may be implemented as the baseband processor 1104, while in another configuration, the apparatus 1102 may be the entire UE (e.g., the UE 450 of FIG. 4) and may include some or all of the abovementioned components, circuits, chips, and/or other circuitry illustrated in the context of the apparatus 1102. In one configuration, the cellular RF transceiver 1122 may be implemented as at least one of the transmitter 454TX and/or the receiver 454RX.

The reception component 1130 may be configured to receive signaling on a wireless channel, such as signaling from a base station 102/180 or UE 104. The transmission component 1134 may be configured to transmit signaling on a wireless channel, such as signaling to a base station 102/180 or UE 104. The communication manager 1132 may coordinate or manage some or all wireless communications by the apparatus 1102, including across the reception component 1130 and the transmission component 1134.

The reception component 1130 may provide some or all data and/or control information included in received signaling to the communication manager 1132, and the communication manager 1132 may generate and provide some or all of the data and/or control information to be included in transmitted signaling to the transmission component 1134. The communication manager 1132 may include the various illustrated components, including one or more components configured to process received data and/or control information, and/or one or more components configured to generate data and/or control information for transmission.

The communication manager 1132 may include a monitoring component 1140, a determination component 1142, a timer component 1144, and a multiplexing component 1146.

The reception component 1130 may be configured to receive a plurality of DRX configurations, e.g., as described in connection with 902 of FIG. 9. In some aspects, each of the plurality of DRX configurations may include at least one value corresponding to at least one of: a start offset, a slot offset, a DRX on duration timer, a DIT, a short DRX cycle timer, a short DRX cycle, a long DRX cycle, a PS offset, a PS wakeup, a PS transmit other periodic CSI, or a PS transmit periodic L1 RSRP. In some aspects, each of the plurality of DRX configurations may be associated with a respective set of LCHs. In some other aspects, each DRX configuration of the plurality of DRX configurations is associated with all carriers with which the apparatus 1102 is configured.

In some aspects, the plurality of DRX configurations may include a first DRX configuration and a second DRX configuration. The first DRX configuration may include at least one first value for at least one of a PS wakeup, a PS transmit ps-TransmitOtherPeriodicCSI, or a ps-TransmitPeriodicL1-RSRP that is separately configured from at least one second value for a corresponding at least one of the PS wakeup, the ps-TransmitOtherPeriodicCSI, or the ps-TransmitPeriodicL1-RSRP, and the at least one first value may be set to be equal to the at least one second value when the first DRX configuration and the second DRX configuration are overlapping in time.

In some other aspects, the transmission component 1134 may be configured to transmit a value requested for a parameter of a first DRX configuration. The plurality of DRX configurations may include a first DRX configuration having the corresponding parameter set to the value requested by the apparatus 1102.

In still further aspects, the apparatus 1102 may be configured to apply one DRX cycle from a plurality of DRX cycles of the plurality of DRX configurations to at least one procedure associated with at least one of RLM, BFD, or RRM. In some examples, the one DRX cycle includes a minimum DRX cycle of the plurality of DRX cycles. In some other examples, the reception component 1130 may be configured to receive information indicating the one DRX cycle.

The reception component 1130 may receive information indicating a mapping between one or more of the plurality of DRX configurations and at least one of a respective PDCCH search space and/or a respective RNTI, e.g., as described in connection with 904 of FIG. 9.

The reception component 1130 may receive information associated with an active time of a first DRX configuration of the plurality of DRX configurations, e.g., as described in connection with 906 of FIG. 9. The active time may be different from an inactive time of the first DRX configuration. In some aspects, the apparatus 1102 may be configured to transition from the inactive time to the active time of the first DRX configuration at a configured time period, and the information associated with the active time of the first DRX configuration may indicate the configured time period. In some aspects, the information associated with the active time of the first DRX configuration is received via one of L1 or L2 signaling. In some aspects, the plurality of DRX configurations may be configured for a first set carriers included in one of FR1 or FR2, and the first DRX configuration may be associated with a second set of carriers included in another of FR1 or FR2.

The monitoring component 1140 may monitor for data based on the active time of the first DRX configuration, e.g., as described in connection with 908 of FIG. 9. For example, the apparatus 1102 may transition from a lower power state (e.g., an inactive state) to a higher power state (e.g., an active state) for an active time of a DRX configuration. During the active time of the DRX configuration, the reception component 1130 may receive signals on a set of resources on which the monitoring component 1140 is configured to detect energy (e.g., RF waves). In some other aspects, the monitoring component 1140 may detect signaling on resources in a PDCCH search space (e.g., a PDCCH search space to which the first DRX configuration is mapped), and the monitoring component 1140 may blindly decode the signaling on the resources in the search space until the monitoring component 1140 finds a PDCCH intended for the apparatus 1102.

In still other aspects, the monitoring component 1140 may be configured to monitor for data based on an active time of a second DRX configuration of the plurality of DRX configurations. In some aspects, the active time of the first DRX configuration and the active time of the second DRX configuration may at least partially overlap.

In yet further aspects, the monitoring component 1140 may monitor for data based on a WUS. For example, the reception component 1130 may be configured to receive a WUS associated with the first DRX configuration, and the WUS may indicate such an association with the first DRX configuration and not an association with other DRX configurations of the plurality of DRX configurations. The monitoring component 1140 may be configured to monitor for the WUS associated with the first DRX configuration in a current slot when each DRX configuration is not in active time in the current slot, and the apparatus 1102 may start a DRX on duration timer of the first DRX configuration based on the WUS when the WUS is received.

The reception component 1130 may be configured to receive DCI associated with at least one of the plurality of DRX configurations, e.g., as described in connection with 910 of FIG. 9. The reception component 1130 may receive the DCI while the apparatus 1102 is in an active state (e.g., an active state of the first DRX configuration and/or an active state of the second DRX configuration) and is monitoring resources. In some aspects, the DCI includes information scheduling one of downlink data or uplink data, and one or more of the plurality of DRX configurations may be associated with a respective LCH on which the one of the downlink data or the uplink data is scheduled. In some other aspects, the reception component 1130 may be configured to receive DCI associated with a first LCH of a set of LCHs when monitoring for the data based on the active time of the first DRX configuration; however, the set of LCHs may be associated with a second DRX configuration of the plurality of DRX configurations. In some other aspects, the reception component 1130 may receive the DCI in a PDCCH search space that is mapped to at least one DRX configuration of the plurality of DRX configurations. In some other aspects, an RNTI with which the information (e.g., DCI) is scrambled indicates the one or more DRX configurations.

In yet further aspects, the DCI may indicate a set of resources on a PDCCH to be skipped (e.g., a set of resources carrying information that the apparatus 1102 is to refrain from decoding). The apparatus 1002 may be further configured to suspend activity of one or more DRX configurations of the plurality of DRX configurations that is active based on such DCI. In some examples, the DCI may further include information identifying the one or more DRX configurations of the plurality of DRX configurations. In some other examples, the one or more DRX configurations may include each DRX configuration that is active when the DCI is received.

The determination component 1142 may determine at least one of the DRX configurations that is mapped to at least one of a respective PDCCH search space and/or a respective RNTI based on the mapping, e.g., as described in connection with 912 of FIG. 9. In one example, the reception component 1130 may receive information configuring a PDCCH search space in which the monitoring component 1140 is to find a downlink transmission (e.g., DCI) carried on a PDCCH intended for the apparatus 1102. The determination component 1142 may look up an entry in the mapping that corresponds to the specific PDCCH search space with which the apparatus 1102 is configured, and the determination component 1142 may identify the at least one DRX configuration corresponding to the entry to which the specific PDCCH search space is mapped. In another example, the reception component 1130 may receive DCI that is scrambled with at least one RNTI associated with the apparatus 1102. The monitoring component 1140 may successfully descramble the RNTI using the at least one RNTI, and based thereon, the determination component 1142 may look up an entry in the mapping that corresponds to the at least one RNTI used to successfully descramble the DCI. The determination component 1142 may identify the one or more DRX configurations mapped to the at least one RNTI used to successfully descramble the DCI based on the entry (or entries) in the mapping that corresponds to the at least one RNTI.

The timer component 1144 may be configured to start or restart a respective DIT of one or more DRX configurations of the plurality of DRX configurations based on the DCI, e.g., as described in connection with 914 of FIG. 9. In some aspects, the timer component 1144 may start or restart a respective DIT of one or more DRX configurations of the plurality of DRX configurations that are mapped to the PDCCH search space in which the reception component 1130 received the DCI (e.g., based on determining the one or more DRX configurations that are mapped to the PDCCH search space). In some other aspects, the timer component 1144 may start or restart a respective DIT of one or more DRX configurations of the plurality of DRX configurations that are mapped to the RNTI with which the monitoring component 1140 successfully descrambled the DCI (e.g., based on determining the one or more DRX configurations that are mapped to the at least one RNTI). In still further aspects, the timer component 1144 may start or restart a respective DIT of each of the plurality of DRX configurations based on the received DCI.

In some additional aspects, the reception component 1130 may be configured to receive DCI indicating to start or restart a respective DRX cycle of each DRX configuration of a subset of the plurality of DRX configurations. In one example, the reception component 1130 may be configured to receive information indicating a first subset of the plurality of DRX configurations and a second subset of the plurality of DRX configurations. The timer component 1144 may be configured to start or restart the DITs of all DRX configurations when at least one of the first subset of DRX configurations is in active time (e.g., based on the received DCI), or the timer component 1144 may be configured to start or restart the DITs of the second subset of DRX configurations when at least one of the second subset of DRX configurations is in active time (e.g., based on the received DCI and when no DRX configuration of the first subset is in active time).

In another example, a subset of the plurality of DRX configurations may include those DRX configurations that do not include a DIT that is running. In such an example, the timer component 1144 may be configured to start or restart the respective DIT of each DRX configuration of the subset based on the DCI. For example, the DCI may include an instruction to start or restart the DITs of the subset of DRX configurations having the DITs that are not running.

The transmission component 1134 may be configured to transmit data on a LCH associated with a first DRX configuration in a scheduled slot occurring during the active time of the first DRX configuration, e.g., as described in connection with 916 of FIG. 9. The timer component 1144 may measure the active time associated with the first DRX configuration using a timer configured with a duration defined by the first DRX configuration.

In some aspects, the transmission component 1134 may be configured to transmit one of periodic or semi-persistent CSI on a PUCCH when a first DRX configuration and a second DRX configuration of the plurality of DRX configurations are simultaneously active and have different values for CSI masking. In some other aspects, the transmission component 1134 may be configured to transmit at least one of CSI or an SRS in a slot when at least one of the plurality of DRX configurations is active in the slot. For example, the reception component 1130 may receive information indicating at least one DRX configuration of the plurality of DRX configurations for which transmission of at least one of CSI or an SRS is permissible, and the transmission component 1134 may transmit the at least one of the CSI or the SRS when the at least one DRX configuration is active.

The multiplexing component 1146 may refrain from multiplexing other uplink data on another LCH associated with another DRX configuration of the plurality of DRX configurations when the other DRX configuration is not in active time, e.g., as described in connection with 918 of FIG. 9. Illustratively, when a DRX configuration n of the plurality of DRX configurations is in active time in a slot i, the multiplexing component 1146 may refrain from multiplexing uplink data from another LCH that is not associated with the DRX configuration n in the slot i. Thus, the determination component 1142 may identify each DRX configuration that is in active time when the apparatus 1102 has uplink data to transmit (e.g., uplink data held in a buffer) on an LCH, and the multiplexing component 1146 may multiplex the uplink data that is associated with the identified DRX configurations but refrain from multiplexing any uplink data that is not associated with the identified DRX configurations.

The reception component 1130 may receive a MAC CE associated with at least one DRX configuration of the plurality of DRX configurations, e.g., as described in connection with 920 of FIG. 9. For example, at least one MAC CE may be included in a MAC header of a frame or subframe received by the reception component 1130, and the at least one MAC CE may include information that is applicable to and/or identifies at least one of the plurality of DRX configurations.

The timer component 1144 may stop a respective DIT of the at least one DRX configuration of the plurality of DRX configurations based on the MAC CE associated with the at least one DRX configuration, e.g., as described in connection with 922 of FIG. 9. In some aspects, the MAC CE associated with the at least one DRX configuration may include information identifying the at least one DRX configuration of the plurality of DRX configurations. In some other aspects, the one or more DRX configurations may include each DRX configuration that is active when the MAC CE associated with the at least one DRX configuration is received. In still other aspects, the MAC CE associated with the at least one DRX configuration may be received in a TB that further includes downlink data on at least one LCH, and the at least one DRX configuration with which the MAC CE is associated may be further associated with a respective LCH of the at least one LCH. In still further aspects, the MAC CE associated with the at least one DRX configuration may be received in a TB that further includes downlink data on at least one LCH, and the at least one DRX configuration may be further associated with a respective LCH of the at least one LCH.

The apparatus 1102 may include additional components that perform some or all of the blocks, operations, signaling, etc. of the algorithm(s) in the aforementioned call flow diagram and/or flowchart of FIGS. 6 and/or 9. As such, some or all of the blocks, operations, signaling, etc. in the aforementioned call flow diagram and/or flowchart of FIGS. 6 and/or 9 may be performed by one or more components and the apparatus 1102 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving a plurality of DRX configurations; means for receiving information associated with an active time of a first DRX configuration of the plurality of DRX configurations, the active time being different from an inactive time of the first DRX configuration; and means for monitoring for data based on the active time of the first DRX configuration.

In one configuration, each of the plurality of DRX configurations includes at least one value corresponding to at least one of: a start offset, a slot offset, a DRX on duration timer, a DRX inactivity timer, a short DRX cycle timer, a short DRX cycle, a long DRX cycle, a PS offset, a PS wakeup, a PS transmit other periodic CSI, or a PS transmit Periodic L1 RSRP.

In one configuration, the information associated with the active time of the first DRX configuration is received via one of L1 or L2 signaling.

In one configuration, the plurality of DRX configurations are configured for a first set carriers included in one of FR 1 or FR 2, and the first DRX configuration is further associated with a second set of carriers included in another of FR 1 or FR 2.

In one configuration, the apparatus 1102, and in particular the cellular baseband processor 1104, may further include means for monitoring for data based on an active time of a second DRX configuration of the plurality of DRX configurations.

In one configuration, each of the plurality of DRX configurations is associated with a respective set of logical channels.

In one configuration, the apparatus 1102, and in particular the cellular baseband processor 1104, may further include means for receiving downlink control information associated with a first logical channel of a set of logical channels associated with a second DRX configuration of the plurality of DRX configurations when monitoring for the data based on the active time of the first DRX configuration.

In one configuration, the apparatus 1102, and in particular the cellular baseband processor 1104, may further include means for receiving DCI; and means for starting or restarting a respective DRX inactivity timer of one or more DRX configurations of the plurality of DRX configurations based on the DCI.

In one configuration, the one or more DRX configurations includes each DRX configuration when the DCI is received.

In one configuration, the DCI includes information scheduling one of downlink data or uplink data, and the one or more DRX configurations are associated with a respective logical channel on which the one of the downlink data or the uplink data is scheduled.

In one configuration, the apparatus 1102, and in particular the cellular baseband processor 1104, may further include means for transmitting uplink data on a logical channel associated with the first DRX configuration in a scheduled slot occurring during the active time of the first DRX configuration; and means for refraining from multiplexing other uplink data on another logical channel not associated with an other DRX configuration of the plurality of DRX configurations that is not in active time of the other DRX configuration.

In one configuration, the apparatus 1102, and in particular the cellular baseband processor 1104, may further include means for receiving information indicating a first subset of the plurality of DRX configurations and a second subset of the plurality of DRX configurations, and the one or more DRX configurations includes the plurality of DRX configurations when at least one of the first sub set of DRX configurations is in active time, or the one or more DRX configurations includes the second subset when at least one of the second subset of DRX configurations is in active time.

In one configuration, the apparatus 1102, and in particular the cellular baseband processor 1104, may further include means for receiving DCI indicating to start or restart a respective DRX cycle of each DRX configuration of a subset of the plurality of DRX configurations, and each DRX configuration of the subset of the plurality of DRX configurations does not include a DRX inactivity timer; and means for starting or restarting the respective DRX inactivity timer of each DRX configuration of the subset of the plurality of DRX configurations based on the DCI.

In one configuration, the apparatus 1102, and in particular the cellular baseband processor 1104, may further include means for receiving DCI in a PDCCH search space; and means for starting or restarting a respective DRX inactivity timer of one or more DRX configurations of the plurality of DRX configurations based on the PDCCH search space that includes the DCI.

In one configuration, the apparatus 1102, and in particular the cellular baseband processor 1104, may further include means for receiving information indicating a mapping between each of the plurality of DRX configurations and at least one of a respective PDCCH search space or a respective RNTI with which DCI in the respective PDCCH search space is scrambled; and means for determining the one or more DRX configurations that are mapped to the PDCCH search space based on the mapping.

In one configuration, the apparatus 1102, and in particular the cellular baseband processor 1104, may further include means for receiving a DRX MAC CE that indicates one or more DRX configurations of the plurality of DRX configurations, and the one or more DRX configurations includes each DRX configuration that is active when the DRX MAC CE is received; and means for stopping a respective DRX inactivity timer of the one or more DRX configurations of the plurality of DRX configurations based on the DRX MAC CE.

In one configuration, the apparatus 1102, and in particular the cellular baseband processor 1104, may further include means for receiving DCI indicating a set of resources on a PDCCH to be skipped; and means for suspending activity of one or more DRX configuration of the plurality of DRX configurations that is active based on the DCI.

In one configuration, the apparatus 1102, and in particular the cellular baseband processor 1104, may further include means for receiving a wakeup signal associated with the first DRX configuration when at least the first DRX configuration is not in active time in a current slot, and the wakeup signal indicates an association with the first DRX configuration and not an association with other DRX configurations of the plurality of DRX configurations; and starting a DRX on duration timer of the first DRX configuration based on the wakeup signal, and the data is monitored for when the DRX on duration timer is running.

In one configuration, the apparatus 1102, and in particular the cellular baseband processor 1104, may further include means for transmitting one of periodic or semi-persistent CSI on a PUCCH when the first DRX configuration and a second DRX configuration of the plurality of DRX configurations are simultaneously active and have different values for CSI masking.

In one configuration, the apparatus 1102, and in particular the cellular baseband processor 1104, may further include means for receiving information indicating one DRX cycle from a plurality of DRX cycles of the plurality of DRX configurations, and the one DRX cycle includes a minimum DRX cycle of the plurality of DRX cycles; and means for applying the one DRX cycle to at least one procedure associated with at least one of RLM, BFD, or RRM.

The aforementioned means may be one or more of the aforementioned components of the apparatus 1102 configured to perform the functions recited by the aforementioned means. As described supra, the apparatus 1102 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 12:
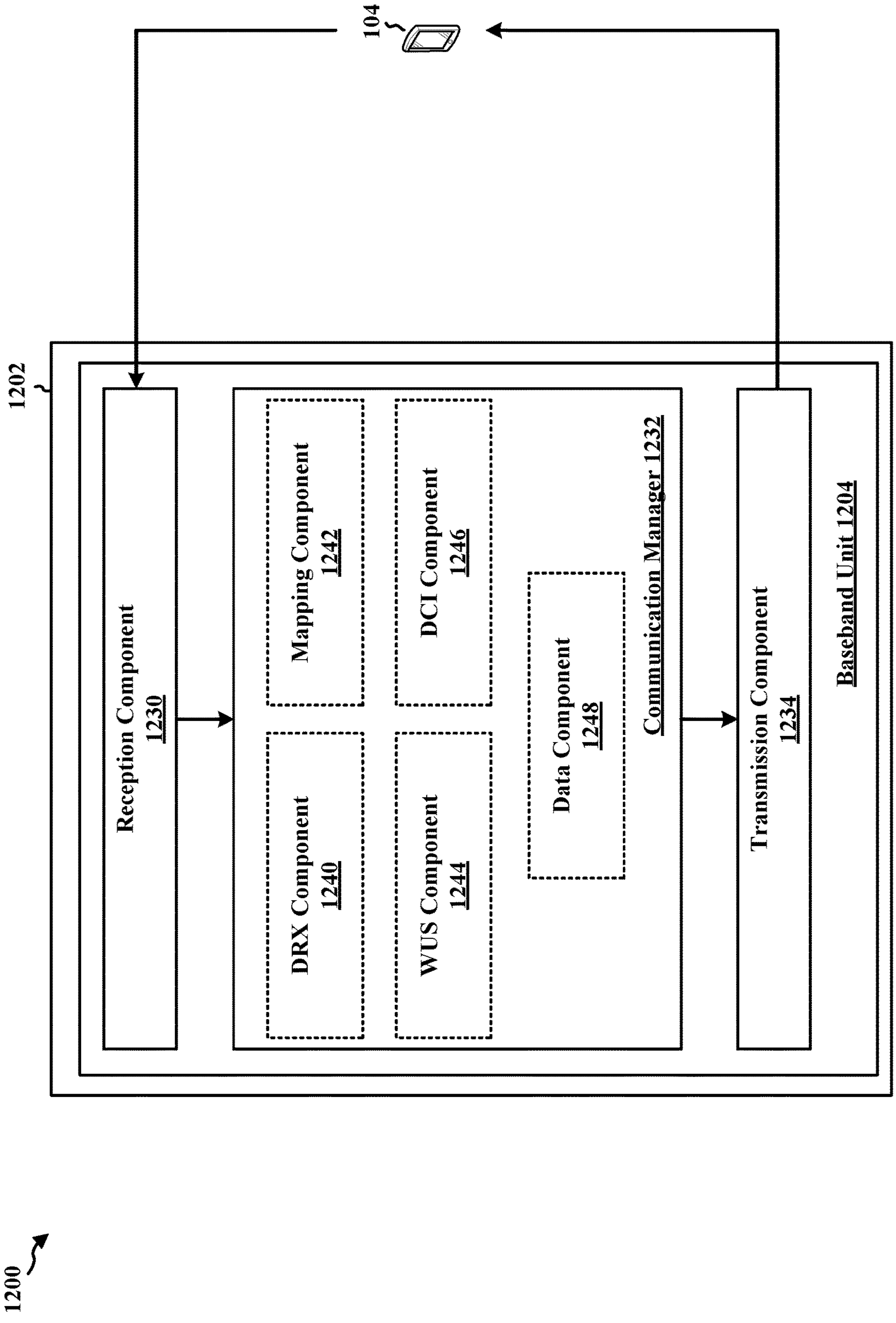
FIG. 12 is a diagram illustrating another example of a hardware implementation for another example apparatus.

FIG. 12 is a diagram 1200 illustrating an example of a hardware implementation for an apparatus 1202. The apparatus 1202 may be a network node, base station, or similar device or system, or the apparatus 1202 may be a component of a network node, base station, or similar device or system. The apparatus 1202 may include a baseband unit 1204. The baseband unit 1204 may communicate through a cellular RF transceiver. For example, the baseband unit 1204 may communicate through a cellular RF transceiver with a UE 104, such as for downlink and/or uplink communication, and/or with a base station 102/180, such as for IAB.

The baseband unit 1204 may include a computer-readable medium/memory, which may be non-transitory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 410 and may include the memory 476 and/or at least one of the TX processor 416, the RX processor 470, and the controller/processor 475.

The reception component 1230 may be configured to receive signaling on a wireless channel, such as signaling from a UE 104 or base station 102/180. The transmission component 1234 may be configured to transmit signaling on a wireless channel, such as signaling to a UE 104 or base station 102/180. The communication manager 1232 may coordinate or manage some or all wireless communications by the apparatus 1202, including across the reception component 1230 and the transmission component 1234.

The reception component 1230 may provide some or all data and/or control information included in received signaling to the communication manager 1232, and the communication manager 1232 may generate and provide some or all of the data and/or control information to be included in transmitted signaling to the transmission component 1234. The communication manager 1232 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication manager 1232 includes a DRX component 1240, a mapping component 1242, a WUS component 1244, and a DCI component 1246.

The DRX component 1240 may generate or configure a plurality of DRX configurations for a UE 104. The transmission component 1234 may transmit, to the UE 104, the plurality of DRX configurations, e.g., as described in connection with 1002 of FIG. 10. In some aspects, each of the plurality of DRX configurations may include at least one value corresponding to at least one of: a start offset, a slot offset, a DRX on duration timer, a DIT, a short DRX cycle timer, a short DRX cycle, a long DRX cycle, a PS offset, a PS wakeup, a PS transmit other periodic CSI, or a PS transmit periodic L1 RSRP. In some aspects, each of the plurality of DRX configurations may be associated with a respective set of LCHs. In some other aspects, each DRX configuration of the plurality of DRX configurations is associated with all carriers with which the UE 104 is configured.

In some aspects, the plurality of DRX configurations may include a first DRX configuration and a second DRX configuration. The first DRX configuration may include at least one first value for at least one of a PS wakeup, a PS transmit ps-TransmitOtherPeriodicCSI, or a ps-TransmitPeriodicL1-RSRP that is separately configured from at least one second value for a corresponding at least one of the PS wakeup, the ps-TransmitOtherPeriodicCSI, or the ps-TransmitPeriodicL1-RSRP, and the at least one first value may be set to be equal to the at least one second value when the first DRX configuration and the second DRX configuration are overlapping in time.

In some other aspects, the reception component 1230 may receive, from the UE 104, a value requested for a parameter of a first DRX configuration. The DRX component 1240 may set a value of the corresponding parameter of a first DRX configuration of the plurality of DRX configurations to the value requested by the UE 104.

In still further aspects, the DRX component 1240 may configure the UE 104 to apply one DRX cycle from a plurality of DRX cycles of the plurality of DRX configurations to at least one procedure associated with at least one of RLM, BFD, or RRM. In some examples, the one DRX cycle includes a minimum DRX cycle of the plurality of DRX cycles. In some other examples, the transmission component 1234 may transmit, to the UE 104, information indicating the one DRX cycle.

The mapping component 1242 may generate a mapping between one or more of the plurality of DRX configurations and at least one of a respective PDCCH search space and/or a respective RNTI. The transmission component 1234 may transmit, to the UE 104, information indicating the mapping between one or more of the plurality of DRX configurations and at least one of a respective PDCCH search space and/or a respective RNTI, e.g., as described in connection with 1004 of FIG. 10.

The transmission component 1234 may transmit, to the UE 104, information associated with an active time of a first DRX configuration of the plurality of DRX configurations, e.g., as described in connection with 1006 of FIG. 10. The active time may be different from an inactive time of the first DRX configuration. In some aspects, the information associated with the active time of the first DRX configuration may configure the UE 104 to transition from the inactive time to the active time of the first DRX configuration at a configured time period. In some aspects, the information associated with the active time of the first DRX configuration is transmitted via one of L1 or L2 signaling. In some aspects, the plurality of DRX configurations may be configured for a first set carriers included in one of FR1 or FR2, and the first DRX configuration may be associated with a second set of carriers included in another of FR1 or FR2.

The WUS component 1244 may generate a WUS associated with at least one DRX configuration of the plurality of DRX configurations, e.g., as described in connection with 1008 of FIG. 10. The transmission component 1234 may transmit, to the UE 104, the WUS associated with at least one DRX configuration of the plurality of DRX configurations. In some aspects, the WUS may configure the UE 104 to monitor for at least one of data and/or control information. For example, the WUS may indicate an association with a first DRX configuration and not an association with other DRX configurations of the plurality of DRX configurations. The transmission component 1234 may transmit the WUS associated with the first DRX configuration in a current slot when each DRX configuration of the UE 104 is not in active time in the current slot; however, the WUS may trigger the UE 104 to start a DRX on duration timer of the first DRX configuration when the WUS is received.

The DCI component 1246 may generate DCI associated with at least one of the plurality of DRX configurations. The transmission component 1234 may transmit, to the UE 104, the DCI associated with at least one of the plurality of DRX configurations, e.g., as described in connection with 1010 of FIG. 10. The transmission component 1234 may transmit the DCI while the UE 104 is in an active state (e.g., an active state of a first DRX configuration and/or an active state of a second DRX configuration) and is monitoring resources. In some aspects, the DCI may configure the UE 104 to start or restart a respective DIT of the at least one DRX configuration of the plurality of DRX configurations. In some aspects, the at least one DRX configuration includes all of the plurality of DRX configurations. In some aspects, the transmission component 1234 may transmit, to the UE 104, information indicating a first subset of the plurality of DRX configurations and a second subset of the plurality of DRX configurations, and the first subset of the plurality of DRX configurations includes each of the plurality of DRX configurations when at least one of the first subset of DRX configurations is in active time, or the at least one DRX configuration includes the second subset when at least one of the second subset of DRX configurations is in active time.

In some aspects, the DCI includes information scheduling one of downlink data or uplink data, and one or more of the plurality of DRX configurations may be associated with a respective LCH on which the one of the downlink data or the uplink data is scheduled. In some other aspects, the transmission component 1234 may transmit DCI associated with a first LCH of a set of LCHs when the UE 104 is monitoring for data based on an active time of a first DRX configuration; however, the set of LCHs may be associated with a second DRX configuration of the plurality of DRX configurations. In some other aspects, the transmission component 1234 may transmit the DCI in a PDCCH search space that is mapped to at least one DRX configuration of the plurality of DRX configurations. In some other aspects, an RNTI with which the DCI (e.g., CRC of the DCI) is scrambled may indicate the at least one DRX configuration. For example, the DCI may indicate a respective DIT of the at least one DRX configuration of the plurality of DRX configurations that is to be started or restarted.

In yet further aspects, the DCI may indicate a set of resources on a PDCCH to be skipped (e.g., a set of resources carrying information that the UE 104 is to refrain from decoding). The DRX component 1240 may configure the UE 104 to suspend activity of one or more DRX configurations of the plurality of DRX configurations that is active based on such DCI. In some examples, the DCI may further include information identifying the one or more DRX configurations of the plurality of DRX configurations. In some other examples, the one or more DRX configurations may include each DRX configuration that is active when the DCI is transmitted.

The data component 1248 may generate data to be transmitted to the UE 104. The transmission component 1234 may transmit, to the UE 104, the data based on active time associated with at least one DRX configuration of the plurality of DRX configurations, e.g., as described in connection with 1012 of FIG. 10. In some examples, the transmission component 1234 may transmit, to the UE 104 in slot i, downlink data associated with LCHs that are associated with DRX configurations in active time in slot i. In some other examples, the transmission component 1234 may transmit, to the UE 104 in slot i, downlink data associated all LCHs when at least one of the DRX configurations with which the UE 104 is configured is in active time in slot i. Illustratively, the transmission component 1234 may transmit, to the UE 104, DCI associated with a first LCH of a set of LCHs associated with a second DRX configuration of the plurality of DRX configurations during active time of a first DRX configuration of the plurality of DRX configurations. The active time of the first DRX configuration and the active time of the second DRX configuration may at least partially overlap. In some aspects, each of the plurality of DRX configurations is associated with a respective set of LCHs.

The transmission component 1234 may transmit, to the UE 104, information indicating at least one DRX configuration of the plurality of DRX configurations for which transmission of at least one of CSI or an SRS is permissible, e.g., as described in connection with 1014 of FIG. 10.

The reception component 1230 may receive, from the UE 104, at least one of CSI or an SRS in a slot when at least one of the plurality of DRX configurations is in active time at the UE 104, e.g., as described in connection with 1016 of FIG. 10. In some aspects, the reception component 1230 may receive, from the UE 104, one of periodic or semi-persistent CSI on a PUCCH when a first DRX configuration and a second DRX configuration of the plurality of DRX configurations are simultaneously in active time and have different values for CSI masking.

The reception component 1230 may receive, from the UE 104, uplink data on an LCH associated with the at least one DRX configuration of the plurality of DRX configurations in a slot scheduled during the active time of the at least one DRX configuration, e.g., as described in connection with 1018 of FIG. 10. In some aspects, other uplink data on another LCH(s) associated with other DRX configuration(s) of the plurality of DRX configurations that is not in active time is not multiplexed with the uplink data on the LCH.

The transmission component 1234 may transmit, to the UE 104, a MAC CE configured to stop a respective DIT of one or more DRX configurations of the plurality of DRX configurations, e.g., as described in connection with 1020 of FIG. 10. In some aspects, the one or more DRX configurations includes each DRX configuration that is active when the MAC CE associated with at least one DRX configuration is transmitted.

The apparatus 1202 may include additional components that perform some or all of the blocks, operations, signaling, etc. of the algorithms in the aforementioned call flow diagram and/or flowchart of FIGS. 6 and/or 10. As such, some or all of the blocks, operations, signaling, etc. in the aforementioned call flow diagram and/or flowchart of FIGS. 6 and/or 10 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting, to a UE, a plurality of DRX configurations; means for transmitting, to the UE, information associated with an active time of a first DRX configuration of the plurality of DRX configurations, the active time being different from an inactive time of the first DRX configuration; and means for transmitting, to the UE, data based on the active time of the first DRX configuration.

In one configuration, each of the plurality of DRX configurations comprises at least one value corresponding to at least one of: a start offset, a slot offset, a DRX on duration timer, a DRX inactivity timer, a short DRX cycle timer, a short DRX cycle, a long DRX cycle, a PS offset, a PS wakeup, a PS transmit other periodic CSI, or a PS transmit Periodic L1 RSRP.

In one configuration, the information associated with the active time of the first DRX configuration is transmitted via one of L1 or L2 signaling.

In one configuration, the plurality of DRX configurations are configured for a first set carriers included in one of FR1 or FR2.

In one configuration, the first DRX configuration is further associated with a second set of carriers included in another of FR1 or FR2.

In one configuration, the apparatus 1202, and in particular the baseband unit 1204, may further include means for transmitting, to the UE, data based on an active time of a second DRX configuration of the plurality of DRX configurations.

In one configuration, the active time of the first DRX configuration and the active time of the second DRX configuration at least partially overlap.

In one configuration, each of the plurality of DRX configurations is associated with a respective set of logical channels.

In one configuration, the apparatus 1202, and in particular the baseband unit 1204, may further include means for transmitting, to the UE, downlink control information associated with a first logical channel of a set of logical channels associated with a second DRX configuration of the plurality of DRX configurations when monitoring for the data based on the active time of the first DRX configuration.

In one configuration, the apparatus 1202, and in particular the baseband unit 1204, may further include means for transmitting, to the UE, DCI that starts or restarts a respective DRX inactivity timer of one or more DRX configurations of the plurality of DRX configurations based on the DCI.

In one configuration, the one or more DRX configurations includes each DRX configuration.

In one configuration, the DCI includes information scheduling one of downlink data or uplink data, and the one or more DRX configurations are associated with a respective logical channel on which the one of the downlink data or the uplink data is scheduled.

In one configuration, the apparatus 1202, and in particular the baseband unit 1204, may further include means for receiving, from the UE, uplink data on a logical channel associated with the first DRX configuration in a scheduled slot occurring during the active time of the first DRX configuration, and other uplink data on another logical channel not associated with an other DRX configuration of the plurality of DRX configurations that is not in active time of the other DRX configuration is not multiplexed with the uplink data on the logical channel.

In one configuration, an RNTI with which the DCI is scrambled indicates the one or more DRX configurations.

In one configuration, the apparatus 1202, and in particular the baseband unit 1204, may further include means for transmitting, to the UE, information indicating a mapping between each of the plurality of DRX configurations and a respective RNTI, and the respective inactivity timer of the one or more DRX configurations are started or restarted based on the mapping.

In one configuration, the apparatus 1202, and in particular the baseband unit 1204, may further include means for transmitting, to the UE, information indicating a first subset of the plurality of DRX configurations and a second subset of the plurality of DRX configurations, and the one or more DRX configurations includes the plurality of DRX configurations when at least one of the first subset of DRX configurations is in active time, or the one or more DRX configurations includes the second subset when at least one of the second subset of DRX configurations is in active time.

In one configuration, the DCI includes information identifying the one or more DRX configurations of the plurality of DRX configurations.

In one configuration, the apparatus 1202, and in particular the baseband unit 1204, may further include means for transmitting, to the UE, DCI in a PDCCH search space, and the PDCCH search space that includes the DCI indicates a respective DRX inactivity timer of one or more DRX configurations of the plurality of DRX configurations that is to be started or restarted.

In one configuration, the apparatus 1202, and in particular the baseband unit 1204, may further include means for transmitting, to the UE, information indicating a mapping between each of the plurality of DRX configurations and a respective PDCCH search space, and the respective inactivity timer of the one or more DRX configurations are to be started or restarted based on the mapping.

In one configuration, the apparatus 1202, and in particular the baseband unit 1204, may further include means for transmitting, to the UE, DCI indicating to start or restart a respective DRX cycle of each DRX configuration of a subset of the plurality of DRX configurations, and each DRX configuration of the subset of the plurality of DRX configurations does not include a DRX inactivity timer.

In one configuration, the apparatus 1202, and in particular the baseband unit 1204, may further include means for transmitting, to the UE, a DRX MAC CE configured to stop a respective DRX inactivity timer of one or more DRX configurations of the plurality of DRX configurations based on the DRX MAC CE.

In one configuration, the one or more DRX configurations includes each DRX configuration that is active when the DRX MAC CE is received.

In one configuration, the DRX MAC CE is received in a TB that further includes downlink data on one or more logical channels, and each of the one or more DRX configurations is associated with a respective logical channel of the one or more logical channels.

In one configuration, the DRX MAC CE includes information identifying the one or more DRX configurations of the plurality of DRX configurations.

In one configuration, the apparatus 1202, and in particular the baseband unit 1204, may further include means for transmitting, to the UE, DCI indicating a set of resources on a PDCCH to be skipped, and the DCI is configured to suspend activity of one or more DRX configurations of the plurality of DRX configurations that is in active time.

In one configuration, the one or more DRX configurations are associated with a respective logical channel on which one of downlink data or uplink data is scheduled by the DCI.

In one configuration, the DCI includes information identifying the one or more DRX configurations of the plurality of DRX configurations.

In one configuration, the apparatus 1202, and in particular the baseband unit 1204, may further include means for transmitting, to the UE, a wakeup signal associated with the first DRX configuration, and the wakeup signal indicates an association with the first DRX configuration and not an association with other DRX configurations of the plurality of DRX configurations; and means for transmitting downlink signaling to the UE or receive uplink signaling from the UE based on transmitting the wakeup signal.

In one configuration, the wakeup signal associated with the first DRX configuration is configured to start a DRX on duration timer of the first DRX configuration.

In one configuration, the wakeup signal associated with the first DRX configuration is configured to start a DRX on duration timer of the first DRX configuration when the first DRX configuration is not in active time in a current slot.

In one configuration, the first DRX configuration includes a first value for at least one of a first PS wakeup, a PS transmit other periodic channel state information (PS-TransmitOtherPeriodicCSI), or a PS transmit periodic Layer 1 reference signal receive power (ps-TransmitPeriodicL1-RSRP) that is different than a second value for at least one of the PS wakeup, the PS-TransmitOtherPeriodicCSI, or the ps-TransmitPeriodicL1-RSRP, and one of the first value or the second value is set as equal to another of the first value or the second value when the first DRX configuration and the second DRX configuration are overlapping in time.

In one configuration, the apparatus 1202, and in particular the baseband unit 1204, may further include means for receiving, from the UE, one of periodic or semi-persistent CSI on a PUCCH when the first DRX configuration and a second DRX configuration of the plurality of DRX configurations are simultaneously in active time and have different values for CSI masking.

In one configuration, the apparatus 1202, and in particular the baseband unit 1204, may further include means for receiving, from the UE, at least one of CSI or a SRS in a slot when at least one of the plurality of DRX configurations is in active time in the slot.

In one configuration, the apparatus 1202, and in particular the baseband unit 1204, may further include means for transmitting, to the UE, information indicating at least one DRX configuration of the plurality of DRX configurations for which transmission of at least one of CSI or an SRS is permissible; and means for receiving, from the UE, the at least one of the CSI or the SRS when the at least one DRX configuration is active.

In one configuration, the apparatus 1202, and in particular the baseband unit 1204, may further include means for receiving, from the UE, a value requested for a parameter of the first DRX configuration; and means for configuring the parameter of the first DRX configuration based on the value.

In one configuration, each DRX configuration of the plurality of DRX configurations is associated with all carriers with which the UE is configured.

The aforementioned means may be one or more of the aforementioned components of the apparatus 1202 configured to perform the functions recited by the aforementioned means. As described supra, the apparatus 1202 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

The following examples are illustrative only and may be combined with aspects of other embodiments or teachings described herein, without limitation.

1. An apparatus for wireless communication at a UE, including:
   a memory; and
   at least one processor coupled to the memory and configured to:
      receive a plurality of DRX configurations;
      receive information associated with an active time of a first DRX configuration of the plurality of DRX configurations, the active time being different from an inactive time of the first DRX configuration; and
      monitor for data based on the active time of the first DRX configuration.
2. The apparatus of clause 1, and each of the plurality of DRX configurations includes at least one value corresponding to at least one of:
   a start offset,
   a slot offset,
   a DRX on duration timer,
   a DRX inactivity timer,
   a short DRX cycle timer,
   a short DRX cycle,
   a long DRX cycle,
   a power saving (PS) offset,
   a PS wakeup,
   a PS transmit other periodic CSI, or
   a PS transmit Periodic L1 RSRP.
3. The apparatus of clause 1, and the at least one processor is further configured to:
   transition from the inactive time to the active time of the first DRX configuration at a configured time period, and the information associated with the active time of the first DRX configuration indicates the configured time period.
4. The apparatus of clause 1, and the information associated with the active time of the first DRX configuration is received via one of L1 or L2 signaling.
5. The apparatus of clause 1, and the plurality of DRX configurations are configured for a first set carriers included in one of FR1 or FR2.
6. The apparatus of clause 5, and the first DRX configuration is further associated with a second set of carriers included in another of FR1 or FR2.
7. The apparatus of clause 1, and the at least one processor is further configured to:
   monitor for data based on an active time of a second DRX configuration of the plurality of DRX configurations.
8. The apparatus of clause 7, and the active time of the first DRX configuration and the active time of the second DRX configuration at least partially overlap.
9. The apparatus of clause 1, and each of the plurality of DRX configurations is associated with a respective set of logical channels.
10. The apparatus of clause 9, and the at least one processor is further configured to:
   receive downlink control information associated with a first logical channel of a set of logical channels associated with a second DRX configuration of the plurality of DRX configurations when monitoring for the data based on the active time of the first DRX configuration.
11. The apparatus of clause 1, and the at least one processor is further configured to:
   receive DCI; and start or restart a respective DRX inactivity timer of one or more DRX configurations of the plurality of DRX configurations based on the DCI.

12. The apparatus of clause 11, and the one or more DRX configurations includes each DRX configuration when the DCI is received.

13. The apparatus of clause 11, and the DCI includes information scheduling one of downlink data or uplink data, and the one or more DRX configurations are associated with a respective logical channel on which the one of the downlink data or the uplink data is scheduled.

14. The apparatus of clause 11, and the at least one processor is further configured to:

transmit uplink data on a logical channel associated with the first DRX configuration in a scheduled slot occurring during the active time of the first DRX configuration; and refrain from multiplexing other uplink data on another logical channel not associated with an other DRX configuration of the plurality of DRX configurations that is not in active time of the other DRX configuration.

15. The apparatus of clause 1, and the at least one processor is further configured to:

receive DCI in a PDCCH search space; and start or restart a respective DRX inactivity timer of one or more DRX configurations of the plurality of DRX configurations based on the PDCCH search space that includes the DCI.

16. The apparatus of clause 15, and the at least one processor is further configured to:

receive information indicating a mapping between each of the plurality of DRX configurations and a respective PDCCH search space; and determine the one or more DRX configurations that are mapped to the PDCCH search space based on the mapping.

17. The apparatus of clause 11, and a RNTI with which the DCI is scrambled indicates the one or more DRX configurations.

18. The apparatus of clause 17, and the at least one processor is further configured to:

receive information indicating a mapping between each of the plurality of DRX configurations and a respective RNTI; and determine the one or more DRX configurations that are mapped to the RNTI based on the mapping.

19. The apparatus of clause 11, and the at least one processor is further configured to:

receive information indicating a first subset of the plurality of DRX configurations and a second subset of the plurality of DRX configurations, and the one or more DRX configurations includes the plurality of DRX configurations when at least one of the first subset of DRX configurations is in active time, or the one or more DRX configurations includes the second subset when at least one of the second subset of DRX configurations is in active time.

20. The apparatus of clause 1, and the at least one processor is further configured to:

receive DCI indicating to start or restart a respective DRX cycle of each DRX configuration of a subset of the plurality of DRX configurations, and each DRX configuration of the subset of the plurality of DRX configurations does not include a DRX inactivity timer; and start or restart the respective DRX inactivity timer of each DRX configuration of the subset of the plurality of DRX configurations based on the DCI.

21. The apparatus of clause 11, and the DCI includes information identifying the one or more DRX configurations of the plurality of DRX configurations.

22. The apparatus of clause 1, and the at least one processor is further configured to:

receive a DRX MAC CE; and stop a respective DRX inactivity timer of one or more DRX configurations of the plurality of DRX configurations based on the DRX MAC CE.

23. The apparatus of clause 22, and the one or more DRX configurations includes each DRX configuration that is active when the DRX MAC CE is received.

24. The apparatus of clause 22, and the DRX MAC CE is received in a TB that further includes downlink data on one or more logical channels, and each of the one or more DRX configurations is associated with a respective logical channel of the one or more logical channels.

25. The apparatus of clause 22, and the DRX MAC CE includes information identifying the one or more DRX configurations of the plurality of DRX configurations.

26. The apparatus of clause 1, and the at least one processor is further configured to:

receive DCI indicating a set of resources on a PDCCH to be skipped; and suspend activity of one or more DRX configuration of the plurality of DRX configurations that is active based on the DCI.

27. The apparatus of clause 26, and the one or more DRX configurations includes each DRX configuration that is active when the DCI is received.

28. The apparatus of clause 26, and the one or more DRX configurations are associated with a respective logical channel on which one of downlink data or uplink data is scheduled by the DCI.

29. The apparatus of clause 26, and the DCI includes information identifying the one or more DRX configurations of the plurality of DRX configurations.

30. The apparatus of clause 1, and the at least one processor is further configured to:

receive a wakeup signal associated with the first DRX configuration, and the wakeup signal indicates an association with the first DRX configuration and not an association with other DRX configurations of the plurality of DRX configurations, and monitoring for the data is further based on the wakeup signal.

31. The apparatus of clause 30, and the at least one processor is further configured to:

monitor for the wakeup signal associated with the first DRX configuration in a current slot when each DRX configuration is not in active time in the current slot; and start a DRX on duration timer of the first DRX configuration based on the wakeup signal when the wakeup signal is received.

32. The apparatus of clause 1, and the at least one processor is further configured to:

monitor for a wakeup signal associated with the first DRX configuration in a current slot when the first DRX configuration is not in active time in the current slot; and start a DRX on duration timer of the first DRX configuration based on the wakeup signal when the wakeup signal is received.

33. The apparatus of clause 1, and the first DRX configuration includes a first value for at least one of a first power save (PS) wakeup, a PS transmit other periodic channel state information (PS-TransmitOtherPeriodicCSI), or a PS transmit periodic Layer 1 reference signal receive power (ps-TransmitPeriodicL1-RSRP) that is different than a second value for at least one of the PS wakeup, the PS-TransmitOtherPeriodicCSI, or the ps-TransmitPeriodicL1-RSRP, and one of the first value or the second value is set as equal to another of the first value or the second value when the first DRX configuration and the second DRX configuration are overlapping in time.
34. The apparatus of clause 1, and the at least one processor is further configured to:
transmit one of periodic or semi-persistent CSI on a PUCCH when the first DRX configuration and a second DRX configuration of the plurality of DRX configurations are simultaneously active and have different values for CSI masking.
35. The apparatus of clause 1, and the at least one processor is further configured to:
transmit at least one of CSI or an SRS in a slot when at least one of the plurality of DRX configurations is active in the slot.
36. The apparatus of clause 1, and the at least one processor is further configured to:
receive information indicating at least one DRX configuration of the plurality of DRX configurations for which transmission of at least one of CSI or an SRS is permissible; and
transmit the at least one of the CSI or the SRS when the at least one DRX configuration is active.
37. The apparatus of clause 1, and the at least one processor is further configured to:
transmit a value requested for a parameter of the first DRX configuration.
38. The apparatus of clause 1, and the at least one processor is further configured to:
apply one DRX cycle from a plurality of DRX cycles of the plurality of DRX configurations to at least one procedure associated with at least one of RLM, BFD, or RRM.
39. The apparatus of clause 38, and the one DRX cycle includes a minimum DRX cycle of the plurality of DRX cycles.
40. The apparatus of clause 38, and the at least one processor is further configured to:
receive information indicating the one DRX cycle.
41. The apparatus of clause 1, and each DRX configuration of the plurality of DRX configurations is associated with all carriers with which the UE is configured.
42. An apparatus for wireless communication at a network node, including:
a memory; and
at least one processor coupled to the memory and configured to:
transmit, to a UE, a plurality of DRX configurations;
transmit, to the UE, information associated with an active time of a first DRX configuration of the plurality of DRX configurations, the active time being different from an inactive time of the first DRX configuration; and
transmit, to the UE, data based on the active time of the first DRX configuration.
43. The apparatus of clause 42, and each of the plurality of DRX configurations includes at least one value corresponding to at least one of:
a start offset,
a slot offset,
a DRX on duration timer,
a DRX inactivity timer,
a short DRX cycle timer,
a short DRX cycle,
a long DRX cycle,
a power saving (PS) offset,
a PS wakeup,
a PS transmit other periodic CSI, or
a PS transmit Periodic L1 RSRP.
44. The apparatus of clause 42, and the information associated with the active time of the first DRX configuration is transmitted via one of L1 or L2 signaling.
45. The apparatus of clause 42, and the plurality of DRX configurations are configured for a first set carriers included in one of FR1 or FR2.
46. The apparatus of clause 45, and the first DRX configuration is further associated with a second set of carriers included in another of FR1 or FR2.
47. The apparatus of clause 42, and the at least one processor is further configured to:
transmit, to the UE, data based on an active time of a second DRX configuration of the plurality of DRX configurations.
48. The apparatus of clause 47, and the active time of the first DRX configuration and the active time of the second DRX configuration at least partially overlap.
49. The apparatus of clause 42, and each of the plurality of DRX configurations is associated with a respective set of logical channels.
50. The apparatus of clause 49, and the at least one processor is further configured to:
transmit, to the UE, downlink control information associated with a first logical channel of a set of logical channels associated with a second DRX configuration of the plurality of DRX configurations when monitoring for the data based on the active time of the first DRX configuration.
51. The apparatus of clause 42, and the at least one processor is further configured to:
transmit, to the UE, DCI that starts or restarts a respective DRX inactivity timer of one or more DRX configurations of the plurality of DRX configurations based on the DCI.
52. The apparatus of clause 51, and the one or more DRX configurations includes each DRX configuration.
53. The apparatus of clause 51, and the DCI includes information scheduling one of downlink data or uplink data, and the one or more DRX configurations are associated with a respective logical channel on which the one of the downlink data or the uplink data is scheduled.
54. The apparatus of clause 51, and the at least one processor is further configured to:
receive, from the UE, uplink data on a logical channel associated with the first DRX configuration in a scheduled slot occurring during the active time of the first DRX configuration, and other uplink data on another logical channel not associated with an other DRX configuration of the plurality of DRX configurations that is not in active time of the other DRX configuration is not multiplexed with the uplink data on the logical channel.

55. The apparatus of clause 51, and a RNTI with which the DCI is scrambled indicates the one or more DRX configurations.
56. The apparatus of clause 55, and the at least one processor is further configured to:
transmit, to the UE, information indicating a mapping between each of the plurality of DRX configurations and a respective RNTI, and the respective inactivity timer of the one or more DRX configurations are started or restarted based on the mapping.
57. The apparatus of clause 51, and the at least one processor is further configured to:
transmit, to the UE, information indicating a first subset of the plurality of DRX configurations and a second subset of the plurality of DRX configurations, and the one or more DRX configurations includes the plurality of DRX configurations when at least one of the first subset of DRX configurations is in active time, or the one or more DRX configurations includes the second subset when at least one of the second subset of DRX configurations is in active time.
58. The apparatus of clause 51, and the DCI includes information identifying the one or more DRX configurations of the plurality of DRX configurations.
59. The apparatus of clause 42, and the at least one processor is further configured to:
transmit, to the UE, DCI in a PDCCH search space, and the PDCCH search space that includes the DCI indicates a respective DRX inactivity timer of one or more DRX configurations of the plurality of DRX configurations that is to be started or restarted.
60. The apparatus of clause 59, and the at least one processor is further configured to:
transmit, to the UE, information indicating a mapping between each of the plurality of DRX configurations and a respective PDCCH search space, and the respective inactivity timer of the one or more DRX configurations are to be started or restarted based on the mapping.
61. The apparatus of clause 42, and the at least one processor is further configured to:
transmit, to the UE, DCI indicating to start or restart a respective DRX cycle of each DRX configuration of a subset of the plurality of DRX configurations, and each DRX configuration of the subset of the plurality of DRX configurations does not include a DRX inactivity timer.
62. The apparatus of clause 42, and the at least one processor is further configured to:
transmit, to the UE, a DRX MAC CE configured to stop a respective DRX inactivity timer of one or more DRX configurations of the plurality of DRX configurations based on the DRX MAC CE.
63. The apparatus of clause 62, and the one or more DRX configurations includes each DRX configuration that is active when the DRX MAC CE is received.
64. The apparatus of clause 62, and the DRX MAC CE is received in a TB that further includes downlink data on one or more logical channels, and each of the one or more DRX configurations is associated with a respective logical channel of the one or more logical channels.
65. The apparatus of clause 62, and the DRX MAC CE includes information identifying the one or more DRX configurations of the plurality of DRX configurations.
66. The apparatus of clause 42, and the at least one processor is further configured to:
transmit, to the UE, DCI indicating a set of resources on a PDCCH to be skipped, and the DCI is configured to suspend activity of one or more DRX configurations of the plurality of DRX configurations that is in active time.
67. The apparatus of clause 66, and the one or more DRX configurations are associated with a respective logical channel on which one of downlink data or uplink data is scheduled by the DCI.
68. The apparatus of clause 66, and the DCI includes information identifying the one or more DRX configurations of the plurality of DRX configurations.
69. The apparatus of clause 42, and the at least one processor is further configured to:
transmit, to the UE, a wakeup signal associated with the first DRX configuration, and the wakeup signal indicates an association with the first DRX configuration and not an association with other DRX configurations of the plurality of DRX configurations; and
transmit downlink signaling to the UE or receive uplink signaling from the UE based on transmitting the wakeup signal.
70. The apparatus of clause 69, and the wakeup signal associated with the first DRX configuration is configured to start a DRX on duration timer of the first DRX configuration.
71. The apparatus of clause 69, and the wakeup signal associated with the first DRX configuration is configured to start a DRX on duration timer of the first DRX configuration when the first DRX configuration is not in active time in a current slot.
72. The apparatus of clause 42, and the first DRX configuration includes a first value for at least one of a first PS wakeup, a PS transmit other periodic channel state information (PS-TransmitOtherPeriodicCSI), or a PS transmit periodic Layer 1 reference signal receive power (ps-TransmitPeriodicL1-RSRP) that is different than a second value for at least one of the PS wakeup, the PS-TransmitOtherPeriodicCSI, or the ps-TransmitPeriodicL1-RSRP, and one of the first value or the second value is set as equal to another of the first value or the second value when the first DRX configuration and the second DRX configuration are overlapping in time.
73. The apparatus of clause 42, and the at least one processor is further configured to:
receive, from the UE, one of periodic or semi-persistent CSI on a PUCCH when the first DRX configuration and a second DRX configuration of the plurality of DRX configurations are simultaneously in active time and have different values for CSI masking.
74. The apparatus of clause 42, and the at least one processor is further configured to:
receive, from the UE, at least one of CSI or a SRS in a slot when at least one of the plurality of DRX configurations is in active time in the slot.
75. The apparatus of clause 42, and the at least one processor is further configured to:
transmit, to the UE, information indicating at least one DRX configuration of the plurality of DRX configurations for which transmission of at least one of CSI or an SRS is permissible; and receive, from the UE, the at least one of the CSI or the SRS when the at least one DRX configuration is active.
76. The apparatus of clause 42, and the at least one processor is further configured to:

receive, from the UE, a value requested for a parameter of the first DRX configuration; and configure the parameter of the first DRX configuration based on the value.

77. The apparatus of clause 42, and each DRX configuration of the plurality of DRX configurations is associated with all carriers with which the UE is configured.

The previous description is provided to enable one of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:

a memory; and at least one processor coupled to the memory and configured to:

receive a plurality of discontinuous reception (DRX) configurations;

receive information indicating one DRX cycle from a plurality of DRX cycles of the plurality of DRX configurations, wherein the one DRX cycle comprises a minimum DRX cycle of the plurality of DRX cycles;

apply the one DRX cycle to at least one procedure associated with at least one of radio link monitoring (RLM), beam failure detection (BFD), or radio resource monitoring (RRM);

receive information associated with an active time of a first DRX configuration of the plurality of DRX configurations, the active time being different from an inactive time of the first DRX configuration; and monitor for data based on the active time of the first DRX configuration.

2. The apparatus of claim 1, wherein each of the plurality of DRX configurations comprises at least one value corresponding to at least one of:

a start offset, a slot offset, a DRX on duration timer, a DRX inactivity timer, a short DRX cycle timer, a short DRX cycle, a long DRX cycle, a power saving (PS) offset, a PS wakeup, a PS transmit other periodic CSI, or a PS transmit Periodic Layer 1 (L1) reference signal received power (RSRP).

3. The apparatus of claim 1, wherein the information associated with the active time of the first DRX configuration is received via one of Layer 1 (L1) or Layer 2 (L2) signaling.

4. The apparatus of claim 1, wherein the plurality of DRX configurations are configured for a first set carriers included in one of frequency range (FR) 1 or FR 2, and wherein the first DRX configuration is further associated with a second set of carriers included in another of FR 1 or FR 2.

5. The apparatus of claim 1, wherein the at least one processor is further configured to:

monitor for data based on an active time of a second DRX configuration of the plurality of DRX configurations.

6. The apparatus of claim 1, wherein each of the plurality of DRX configurations is associated with a respective set of logical channels.

7. The apparatus of claim 6, wherein the at least one processor is further configured to:

receive downlink control information associated with a first logical channel of a set of logical channels associated with a second DRX configuration of the plurality of DRX configurations when monitoring for the data based on the active time of the first DRX configuration.

8. The apparatus of claim 1, wherein the at least one processor is further configured to:

receive downlink control information (DCI); and start or restart a respective DRX inactivity timer of one or more DRX configurations of the plurality of DRX configurations based on the DCI.

9. The apparatus of claim 8, wherein the one or more DRX configurations comprises each DRX configuration when the DCI is received.

10. The apparatus of claim 8, wherein the DCI includes information scheduling one of downlink data or uplink data, wherein the one or more DRX configurations are associated with a respective logical channel on which the one of the downlink data or the uplink data is scheduled.

11. The apparatus of claim 8, wherein the at least one processor is further configured to:

transmit uplink data on a logical channel associated with the first DRX configuration in a scheduled slot occurring during the active time of the first DRX configuration; and refrain from multiplexing other uplink data on another logical channel not associated with an other DRX configuration of the plurality of DRX configurations that is not in active time of the other DRX configuration.

12. The apparatus of claim 8, wherein the at least one processor is further configured to:

receive information indicating a first subset of the plurality of DRX configurations and a second subset of the plurality of DRX configurations, wherein the one or more DRX configurations comprises the plurality of DRX configurations when at least one of the first subset of DRX configurations is in active time, or the one or more DRX configurations comprises the second subset when at least one of the second subset of DRX configurations is in active time.

13. The apparatus of claim 1, wherein the at least one processor is further configured to:

receive downlink control information (DCI) indicating to start or restart a respective DRX cycle of each DRX configuration of a subset of the plurality of DRX configurations, wherein each DRX configuration of the subset of the plurality of DRX configurations does not include a DRX inactivity timer; and start or restart the respective DRX inactivity timer of each DRX configuration of the subset of the plurality of DRX configurations based on the DCI.

14. The apparatus of claim 1, wherein the at least one processor is further configured to:

receive downlink control information (DCI) in a physical downlink control channel (PDCCH) search space; and start or restart a respective DRX inactivity timer of one or more DRX configurations of the plurality of DRX configurations based on the PDCCH search space that includes the DCI.

15. The apparatus of claim 14, wherein the at least one processor is further configured to:

receive information indicating a mapping between each of the plurality of DRX configurations and at least one of a respective PDCCH search space or a respective radio network temporary identifier (RNTI) with which DCI in the respective PDCCH search space is scrambled; and determine the one or more DRX configurations that are mapped to the PDCCH search space based on the mapping.

16. The apparatus of claim 1, wherein the at least one processor is further configured to:

receive a DRX medium access control (MAC) control element (CE) that indicates one or more DRX configurations of the plurality of DRX configurations, wherein the one or more DRX configurations comprises each DRX configuration that is active when the DRX MAC CE is received; and stop a respective DRX inactivity timer of the one or more DRX configurations of the plurality of DRX configurations based on the DRX MAC CE.

17. The apparatus of claim 1, wherein the at least one processor is further configured to:

receive downlink control information (DCI) indicating a set of resources on a physical downlink control channel (PDCCH) to be skipped; and suspend activity of one or more DRX configuration of the plurality of DRX configurations that is active based on the DCI.

18. The apparatus of claim 1, the at least one processor is further configured to:

receive a wakeup signal associated with the first DRX configuration when at least the first DRX configuration is not in active time in a current slot, wherein the wakeup signal indicates an association with the first DRX configuration and not an association with other DRX configurations of the plurality of DRX configurations; and start a DRX on duration timer of the first DRX configuration based on the wakeup signal, wherein the data is monitored for when the DRX on duration timer is running.

19. The apparatus of claim 1, wherein the at least one processor is further configured to:

transmit one of periodic or semi-persistent channel state information (CSI) on a physical uplink control channel (PUCCH) when the first DRX configuration and a second DRX configuration of the plurality of DRX configurations are simultaneously active and have different values for CSI masking.

20. An apparatus for wireless communication at a network node, comprising:

a memory; and at least one processor coupled to the memory and configured to:

transmit, to a user equipment (UE), a plurality of discontinuous reception (DRX) configurations;

transmit, to the UE, information indicating one DRX cycle from a plurality of DRX cycles of the plurality of DRX configurations, wherein the one DRX cycle comprises a minimum DRX cycle of the plurality of DRX cycles and is applied to at least one procedure associated with at least one of radio link monitoring (RLM), beam failure detection (BFD), or radio resource monitoring (RRM);

transmit, to the UE, information associated with an active time of a first DRX configuration of the plurality of DRX configurations, the active time being different from an inactive time of the first DRX configuration; and transmit, to the UE, data based on the active time of the first DRX configuration.

21. The apparatus of claim 20, wherein each of the plurality of DRX configurations comprises at least one value corresponding to at least one of:

a start offset, a slot offset, a DRX on duration timer,
a DRX inactivity timer,
a short DRX cycle timer,
a short DRX cycle,
a long DRX cycle,
a power saving (PS) offset,
a PS wakeup,
a PS transmit other periodic CSI, or
a PS transmit Periodic Layer 1 (L1) reference signal received power (RSRP).

22. The apparatus of claim 20, wherein the information associated with the active time of the first DRX configuration is transmitted via one of Layer 1 (L1) or Layer 2 (L2) signaling.

23. The apparatus of claim 20, wherein the plurality of DRX configurations are configured for a first set carriers included in one of frequency range (FR) 1 or FR 2, and wherein the first DRX configuration is further associated with a second set of carriers included in another of FR 1 or FR 2.

24. The apparatus of claim 20, wherein the at least one processor is further configured to:

transmit, to the UE, data based on an active time of a second DRX configuration of the plurality of DRX configurations.

25. A method of wireless communication at a user equipment (UE), comprising:

receiving a plurality of discontinuous reception (DRX) configurations;
receiving information indicating one DRX cycle from a plurality of DRX cycles of the plurality of DRX configurations, wherein the one DRX cycle comprises a minimum DRX cycle of the plurality of DRX cycles;
applying the one DRX cycle to at least one procedure associated with at least one of radio link monitoring (RLM), beam failure detection (BFD), or radio resource monitoring (RRM);
receiving information associated with an active time of a first DRX configuration of the plurality of DRX configurations, the active time being different from an inactive time of the first DRX configuration; and
monitoring for data based on the active time of the first DRX configuration.

26. The method of claim 25, wherein each of the plurality of DRX configurations comprises at least one value corresponding to at least one of:

a start offset,
a slot offset,
a DRX on duration timer,
a DRX inactivity timer,
a short DRX cycle timer,
a short DRX cycle,
a long DRX cycle,
a power saving (PS) offset,
a PS wakeup,
a PS transmit other periodic CSI, or
a PS transmit Periodic Layer 1 (L1) reference signal received power (RSRP).

27. The method of claim 25, wherein the plurality of DRX configurations are configured for a first set carriers included in one of frequency range (FR) 1 or FR 2, and wherein the first DRX configuration is further associated with a second set of carriers included in another of FR 1 or FR 2.

28. A method of wireless communication at a network node, comprising:

transmitting, to a user equipment (UE), a plurality of discontinuous reception (DRX) configurations;
transmitting, to the UE, information indicating one DRX cycle from a plurality of DRX cycles of the plurality of DRX configurations, wherein the one DRX cycle comprises a minimum DRX cycle of the plurality of DRX cycles and is applied to at least one procedure associated with at least one of radio link monitoring (RLM), beam failure detection (BFD), or radio resource monitoring (RRM);
transmitting, to the UE, information associated with an active time of a first DRX configuration of the plurality of DRX configurations, the active time being different from an inactive time of the first DRX configuration; and
transmitting, to the UE, data based on the active time of the first DRX configuration.

29. The method of claim 28, wherein each of the plurality of DRX configurations comprises at least one value corresponding to at least one of:

a start offset,
a slot offset,
a DRX on duration timer,
a DRX inactivity timer,
a short DRX cycle timer,
a short DRX cycle,
a long DRX cycle,
a power saving (PS) offset,
a PS wakeup,
a PS transmit other periodic CSI, or
a PS transmit Periodic Layer 1 (L1) reference signal received power (RSRP).

* * * * *